(12) United States Patent
Valchok

(10) Patent No.: US 11,731,699 B2
(45) Date of Patent: Aug. 22, 2023

(54) METHODS AND PROCESSORS FOR CONTROLLING STEERING OF SELF-DRIVING CAR

(71) Applicant: YANDEX SELF DRIVING GROUP LLC, Moscow (RU)

(72) Inventor: Andrei Yurievich Valchok, Minsk (BY)

(73) Assignee: YANDEX SELF DRIVING GROUP LLC, Moscow (RU)

(*) Notice: Subject to any disclaimer, the term of this patent is extended or adjusted under 35 U.S.C. 154(b) by 238 days.

(21) Appl. No.: 17/060,397

(22) Filed: Oct. 1, 2020

(65) Prior Publication Data

US 2021/0197895 A1 Jul. 1, 2021

(30) Foreign Application Priority Data

Dec. 30, 2019 (RU) ............................ RU2019145038

(51) Int. Cl.
*B60W 50/06* (2006.01)
*B62D 15/02* (2006.01)
(Continued)

(52) U.S. Cl.
CPC ......... *B62D 15/025* (2013.01); *B62D 15/021* (2013.01); *G05D 1/0088* (2013.01);
(Continued)

(58) Field of Classification Search
CPC ......... B60W 2420/52; B60W 2520/06; B60W 50/06; B60W 60/001; B60W 60/0025;
(Continued)

(56) References Cited

U.S. PATENT DOCUMENTS 9,834,224 B2 12/2017 Gordon et al.
10,198,001 B2 2/2019 Shashua et al.
(Continued)

FOREIGN PATENT DOCUMENTS

DE 102019202090 A1 9/2019
EP 3401786 A2 11/2018

OTHER PUBLICATIONS

European Search Report completed Apr. 1, 2021 issued in respect of the counterpart European Patent Application No. 20207084.3.
(Continued)

*Primary Examiner* — Behrang Badii
*Assistant Examiner* — Matthew J. Reda
(74) *Attorney, Agent, or Firm* — BCF LLP

(57) ABSTRACT

A method and processor for controlling steering of a Self-Driving Car (SDC) are disclosed. The method includes: acquiring SDC state data associated with vertices in a graph-structure, using the SDC state data for building a polynomial curve, using the polynomial curve for simulating a candidate trajectory of the SDC as if the SDC is steered in accordance therewith and such that a closest allowed steering wheel position to a non-allowed steering wheel position is used instead of the non-allowed steering wheel position, determining an offset between the simulated state and a target state of the SDC, selecting candidate steering profile as a target steering profile of the SDC based on the offset, and using the target steering profile of the SDC for controlling steering of the SDC. A method of training a Machine Learning Algorithm for predicting steering wheel positions to control steering of the SDC is also disclosed.

16 Claims, 11 Drawing Sheets

(51) Int. Cl.
  *G06N 20/00* (2019.01)
  *G05D 1/00* (2006.01)
  *G05D 1/02* (2020.01)
  *G07C 5/04* (2006.01)
  *G06V 10/764* (2022.01)
  *G06V 10/82* (2022.01)
  *G06V 20/56* (2022.01)
  *B60W 60/00* (2020.01)

(52) U.S. Cl.
  CPC ......... *G05D 1/0212* (2013.01); *G05D 1/0276* (2013.01); *G06N 20/00* (2019.01); *G06V 10/764* (2022.01); *G06V 10/82* (2022.01); *G06V 20/56* (2022.01); *G07C 5/04* (2013.01); *B60W 60/001* (2020.02); *B60W 2520/06* (2013.01); *G05D 2201/0213* (2013.01)

(58) Field of Classification Search
  CPC ... B62D 15/021; B62D 15/025; G01S 17/931; G01S 7/4808; G01S 7/497; G01S 7/4972; G05D 1/0088; G05D 1/0212; G05D 1/0276; G05D 2201/0213; G06N 20/00; G06N 3/044; G06N 3/08; G06V 10/764; G06V 10/82; G06V 20/56; G07C 5/04
  See application file for complete search history.

(56) References Cited

U.S. PATENT DOCUMENTS

| | | | |
|---|---|---|---|
| 10,254,121 | B2 | 4/2019 | Stentz et al. |
| 10,496,766 | B2 | 12/2019 | Levinson et al. |
| 2009/0157260 | A1* | 6/2009 | Lee ............... B62D 15/0285 701/41 |
| 2012/0158218 | A1* | 6/2012 | Funabiki ............ G05D 1/0083 701/3 |
| 2013/0060413 | A1* | 3/2013 | Lee ....................... B62D 6/00 701/23 |
| 2016/0229451 | A1* | 8/2016 | Raad .................... B62D 15/027 |
| 2018/0089563 | A1 | 3/2018 | Redding et al. |
| 2018/0281856 | A1 | 10/2018 | Talamonti et al. |
| 2019/0056736 | A1 | 2/2019 | Wood et al. |
| 2019/0113927 | A1* | 4/2019 | England ................ G06N 5/046 |
| 2019/0377339 | A1* | 12/2019 | Nath .................... B60W 10/18 |

OTHER PUBLICATIONS

McNaughton, "Motion Planning for Autonomous Driving with a Conformal Spatiotemporal Lattice", 2011 IEEE International Conference on Robotics and Automation, Shanghai, 2011, pp. 4889-4895, doi: 10.1109/ICRA.2011.5980223.

* cited by examiner

METHODS AND PROCESSORS FOR CONTROLLING STEERING OF SELF-DRIVING CAR

CROSS-REFERENCE

The present application claims priority to Russian Patent Application No. 2019145038, entitled "Methods and Processors for Controlling Steering of Self-Driving Car", filed Dec. 30, 2019, the entirety of which is incorporated herein by reference.

FIELD OF TECHNOLOGY

The present technology relates to self-driving cars and, specifically, to a method and a processor for controlling steering of a Self-Driving Car (SDC).

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver), so-called Self-Driving Cars (SDCs). A given SDC includes computer systems that can cause the SDC to accelerate, break, stop, change lane and self-park.

One of the technical challenges in implementing the above computer systems is planning a SDC trajectory with respect to an obstacle (another vehicle, for example) the SDC may face while driving. Another one of the technical challenges in implementing the above computer systems is determining how to steer the SDC so that the SDC actually follows the so-planned trajectory for avoiding the obstacle.

SUMMARY

It is an object of the present technology to ameliorate at least some of the inconveniences present in the prior art. Embodiments of the present technology may provide and/or broaden the scope of approaches to methods of achieving the aims and objects of the present technology.

Developers of the present technology have appreciated at least one technical problem associated with the prior art approaches. Developers of the present technology have realized that controlling steering of a Self-Driving Car (SDC) encompasses at least two main problems. Firstly, controlling steering of the SDC is technically challenging since the steering profile of the SDC must result in a trajectory that aids in transitioning from a first pre-determined state of the SDC to a next pre-determined state of the SDC. However, in addition to that, even if a given steering profile does result in a trajectory that allows the SDC to transition form the first pre-determined state of the SDC to the next pre-determined state of the SDC, the steering profile may encompass steering wheel positions that are either too dangerous to perform in real-life situations or outside the permissible range of steering wheel positions that the SDC is physically able to have.

In a first broad aspect of the present technology, there is provided a computer-implemented method of controlling steering of a Self-Driving Car (SDC). The SDC is communicatively coupled to a processor. The SDC has a pre-determined range of steering wheel positions that are physically possible for the SDC. The method is executable by the processor. The method comprises acquiring, by the processor from a memory, SDC state data associated with two sequential vertices in a graph-structure. Vertices of the graph-structure define a series of target states of the SDC on a route. A first of the two sequential vertices defines a first target state of the SDC along the route. A second of the two sequential vertices defines a second target state of the SDC along the route. The method comprises using, by the processor, the SDC state data for acquiring a set of parameters for building a polynomial curve. The polynomial curve is representative of a candidate steering profile of the SDC for attempting to transition from the first target state to the second target state. The candidate steering profile represents a plurality of candidate steering wheel positions for the SDC at respective moments in time between (i) a moment in time associated with the first target state and (ii) a moment in time associated with the second target state. At least one candidate steering wheel position from the plurality of candidate steering wheel positions is a non-allowed steering wheel position. The non-allowed steering wheel position is outside the pre-determined range of steering wheel positions of the SDC. The method comprises using, by the processor, the polynomial curve for simulating a candidate trajectory of the SDC as if the SDC is steered in accordance with the plurality of candidate steering wheel positions at the respective moments in time, and such that a closest allowed steering wheel position to the non-allowed steering wheel position in the pre-determined range of steering wheel positions is used instead of the non-allowed steering wheel position. The candidate trajectory (i) begins at the first target state of the SDC and (ii) terminates at a simulated state of the SDC. The method comprises determining, by the processor, an offset between the simulated state of the SDC and the second target state of the SDC. The method comprises in response to the offset being below a pre-determined threshold, selecting, by the processor, the candidate steering profile as a target steering profile of the SDC. The method comprises using, by the processor, the target steering profile of the SDC for controlling steering of the SDC when the SDC is in the first target state.

In some embodiments of the method, prior to the acquiring the SDC state data, the method further comprises generating, by the processor, the graph-structure for the route that the SDC is to undertake.

In some embodiments of the method, the memory is a memory of a remote server.

In some embodiments of the method, the set of parameters is acquired from the memory.

In some embodiments of the method, the memory is configured to store respective sets of parameters for respective pairs of sequential pre-determined SDC states.

In some embodiments of the method, the SDC state data associated with a given state of the SDC comprises a plurality of state values.

In some embodiments of the method, each of the plurality of state values comprises at least: a position value, a time value, a vehicle orientation value, and a steering position value.

In some embodiments of the method, the set of parameters comprises at least four parameters.

In some embodiments of the method, the set of parameters comprises at least one parameter being indicative of a total amount of steering movement.

In some embodiments of the method, the polynomial curve is built as a polynomial function of a third degree.

In some embodiments of the method, the pre-determined range of steering wheel positions is indicative of a maximum amplitude of steering that the SDC is physically configured to perform.

In some embodiments of the method, the method further comprises comparing, by the processor, the offset against the pre-determined threshold.

In some embodiments of the method, the offset is below the pre-determined threshold when the simulated state of the SDC matches the second target state of the SDC.

In some embodiments of the method, in response to the offset being above the pre-determined threshold, the method further comprises performing, by the processor, an adjustment procedure. The adjustment procedure comprises using, by the processor, the offset for adjusting the set of parameters, thereby determining a set of adjusted parameters for building an adjusted polynomial curve. The adjusted polynomial curve is representative of an adjusted steering profile for the SDC for attempting to transition from the first target state to the second target state. The adjustment procedure comprises using, by the processor, the adjusted polynomial curve for simulating a second candidate trajectory of the SDC as if the SDC is steered in accordance with the adjusted steering profile. The second candidate trajectory (i) begins at the first target state of the SDC and (ii) terminating at a second simulated state of the SDC. The adjustment procedure comprises determining, by the processor, a second offset between the second simulated state of the SDC and the second target state of the SDC. The adjustment procedure comprises in response to the second offset being below the pre-determined threshold, selecting, by the processor, the adjusted steering profile as the target steering profile for the SDC.

In some embodiments of the method, the method further comprises iteratively repeating, by the processor, the adjustment procedure until a given offset is below the pre-determined threshold.

In some embodiments of the method, the method further comprises using, by the server, (i) the first target state, (ii) the second target state, and (iii) the target steering profile of the SDC to train a Machine Learning Algorithm (MLA) to predict an in-use steering wheel position for the SDC for a current in-use state of the SDC while taking into account that an in-use trajectory of the SDC is to end at a second in-use target state.

In a second broad aspect of the present technology, there is provided a method of training a Machine Learning Algorithm (MLA) for predicting steering wheel positions for controlling steering of a Self-Driving Car (SDC). The SDC is communicatively coupled to a processor. The method is executable by the processor. The method comprises acquiring, by the processor, a plurality of training data sets associated with a training trajectory of the SDC. The training trajectory has a plurality of target states of the SDC. The plurality of target states includes (i) a first target state of the SDC, (ii) a set of intermediary target states, and (iii) a second target state of the SDC. The target trajectory (i) begins with the SDC being in the first target state, (ii) continues with the SDC being sequentially in the set of intermediary target states, and (iii) ends with the SDC being in the second target state. The training trajectory is associated with a plurality of actual steering wheel positions at different moments in time. A given actual steering wheel position at a given moment in time is for arriving from a given target state of the training trajectory to a sequential target state of the training trajectory. A given one of the plurality of training data sets includes (i) a training input and (ii) a respective label. The training input is indicative of (i) a training target state and (ii) the second target state. The training target state is at least one of (i) the first target state and (ii) one of the plurality of intermediary target states. The respective label is indicative of the actual steering wheel position at a respective moment in time for arriving from the training target state to the sequential target state of the training trajectory. The method comprises inputting, by the processor, the given training data set into the MLA for determining a predicted steering wheel position for arriving from the training target state at the respective moment in time to the sequential target state while taking into account that the training trajectory is to end with the second target state. The method comprises determining, by the processor, a difference between the predicted steering wheel position for the training target state and the actual steering wheel position for the training target state. The method comprises training, by the processor, the MLA based on the difference to predict an in-use steering wheel position for the SDC for a current in-use state of the SDC while taking into account that an in-use trajectory of the SDC is to end at a second in-use target state.

In some embodiments of the method, the inputting comprises iteratively inputting, by the processor, respective training data sets from the plurality of training data sets into the MLA for determining respective predicted steering wheel positions. The training comprises iteratively training, by the processor the MLA based on differences between the respective predicted steering wheel positions and respective actual steering wheel positions.

In some embodiments of the method, the plurality of actual steering wheel positions associated with the training trajectory are in a form of a steering profile for the training trajectory. The steering profile has been built by the processor as a polynomial curve representative of a given steering profile of the SDC that allows the SDC to transition from the first target state to the second target state.

In some embodiments of the method, the training trajectory and the actual steering wheel positions associated therewith have been gathered by a device associated with one of: (i) a vehicle during operation thereof by a human driver (ii) a training SDC.

In some embodiments of the method, the plurality of target states of the training trajectory are selected for avoiding an obstacle, and where the training input is further indicative of a position of the obstacle.

In some embodiments of the method, the training input is indicative of the first target state, the one of the plurality of intermediary target states, and the second target state.

In some embodiments of the method, the training input is further indicative of at least one of a position of a center of a lane on which the optimal trajectory is located.

In some embodiments of the method, the MLA is implemented as a Recurrent Neural Network (RNN) having an internal state, and wherein the training input is further indicative of a preceding target state to the one of the plurality of intermediary target states.

In a third broad aspect of the present technology, there is provided a processor for training a Machine Learning Algorithm (MLA) for predicting steering wheel positions for controlling steering of a Self-Driving Car (SDC). The processor is configured to acquire a plurality of training data sets associated with a training trajectory of the SDC. The training trajectory has a plurality of target states of the SDC. The plurality of target states includes (i) a first target state of the SDC, (ii) a set of intermediary target states, and (iii) a second target state of the SDC. The target trajectory (i) begins with the SDC being in the first target state, (ii) continues with the SDC being sequentially in the set of intermediary target states, and (iii) ends with the SDC being in the second target state. The training trajectory is associated with a plurality of actual steering wheel positions at different moments in time. A given actual steering wheel position at a given moment in time is for arriving from a given target state of the training trajectory to a sequential target state of the training trajectory. A given one of the plurality of training data sets includes (i) a training input and (ii) a respective label. The training input is indicative of (i) a training target state and (ii) the second target state. The training target state is at least one of (i) the first target state and (ii) one of the plurality of intermediary target states. The respective label is indicative of the actual steering wheel position at a respective moment in time for arriving from the training target state to the sequential target state of the training trajectory. The processor is configured to input the given training data set into the MLA for determining a predicted steering wheel position for arriving from the training target state at the respective moment in time to the sequential target state while taking into account that the training trajectory is to end with the second target state. The processor is configured to determine a difference between the predicted steering wheel position for the training target state and the actual steering wheel position for the training target state. The processor is configured to train the MLA based on the difference to predict an in-use steering wheel position for the SDC for a current in-use state of the SDC while taking into account that an in-use trajectory of the SDC is to end at a second in-use target state.

In some embodiments of the processor, to input comprises the processor configured to iteratively input respective training data sets from the plurality of training data sets into the MLA for determining respective predicted steering wheel positions, and where to train comprises the processor configured to iteratively train the MLA based on differences between the respective predicted steering wheel positions and respective actual steering wheel positions.

In some embodiments of the processor, the plurality of actual steering wheel positions associated with the training trajectory are in a form of a steering profile for the training trajectory, the steering profile having been built by the processor as a polynomial curve representative of a given steering profile of the SDC that allows the SDC to transition from the first target state to the second target state.

In some embodiments of the processor, the training trajectory and the actual steering wheel positions associated therewith have been gathered by a device associated with one of: (i) a vehicle during operation thereof by a human driver (ii) a training SDC.

In some embodiments of the processor, the plurality of target states of the training trajectory are selected for avoiding an obstacle, and wherein the training input is further indicative of a position of the obstacle.

In some embodiments of the processor, the training input is indicative of the first target state, the one of the plurality of intermediary target states, and the second target state.

In some embodiments of the processor, the training input is further indicative of at least one of a position of a center of a lane on which the optimal trajectory is located.

In some embodiments of the processor, the MLA is implemented as a Recurrent Neural Network (RNN) having an internal state, and wherein the training input is further indicative of a preceding target state to the one of the plurality of intermediary target states.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
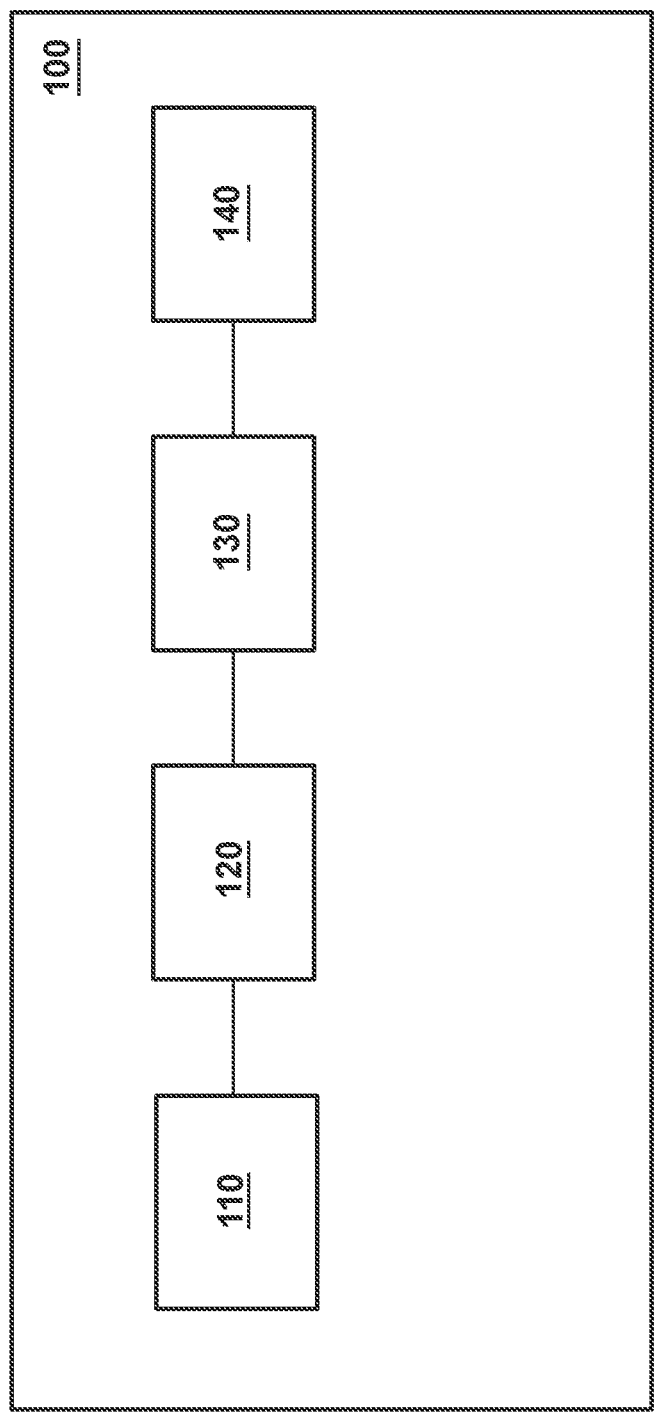
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
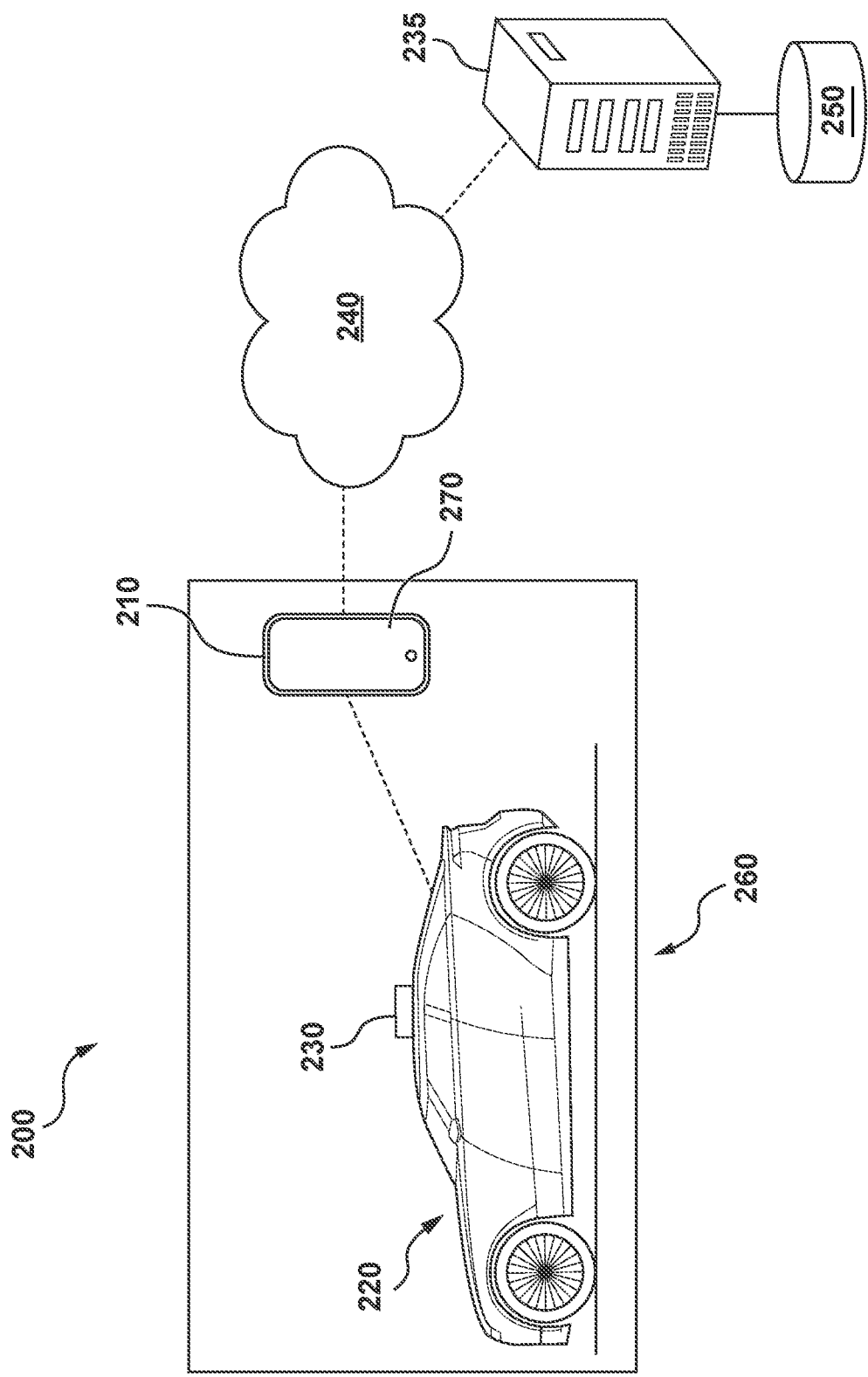
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 250. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other embodiments of the present technology, the camera is configured to capture an image (or a series of images) that represent approximately 180 degrees of the surrounding area 250 around the vehicle 220 that are along a movement path of the vehicle 220. In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6 W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light (~3×10$^8$ m/s), the processor 110 can then calculate how far the photons have travelled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, Calif. 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of then present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the network computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Figure 3:
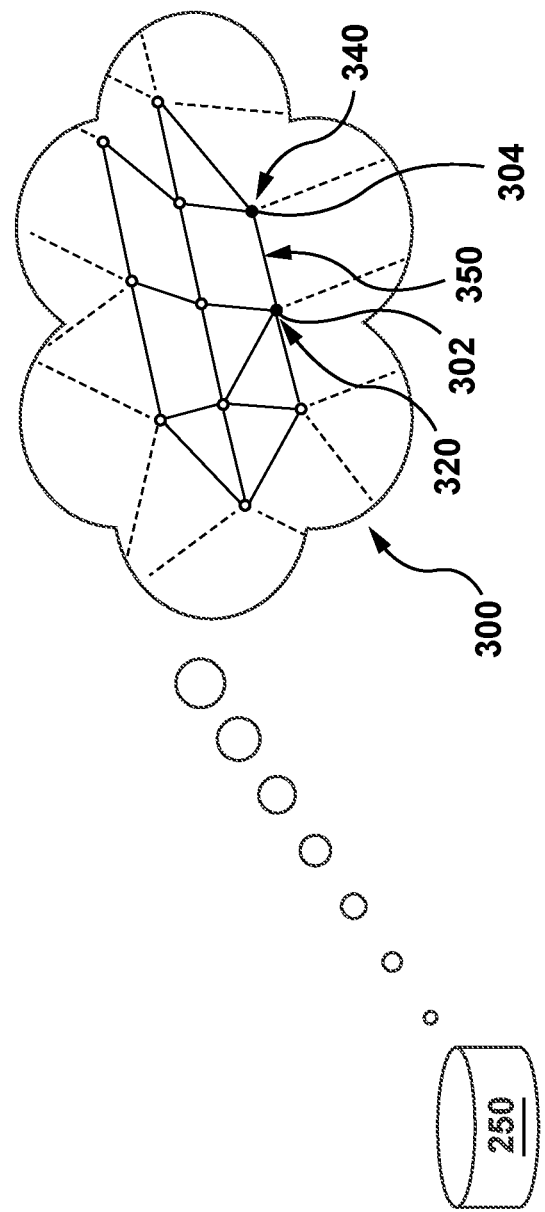
FIG. 3 depicts a graph-structure stored within the networked computing environment of FIG. 2, in accordance with at least some embodiments of the present technology.

In some embodiments of the present technology, the storage 250 may be configured to store a graph-structure 300 depicted in FIG. 3. Broadly speaking, the graph-structure 300 comprises a plurality of vertices where each vertex represents time and variables defining a plurality of target states of the vehicle 220.

As it will become apparent from the description herein further below, the processor 110 may be configured to generate the graph-structure 300 for a given route that the vehicle 220 is to undertake, and where a respective vertex of the graph-structure 300 defines a respective target state in which the vehicle 220 may find itself along that route. Put another way, the graph-structure 300 defines a series of target states in which the vehicle 220 may potentially find itself along the route.

To better illustrate this, in FIG. 3, there is depicted a first vertex 302 and a second vertex 304 of the graph-structure 300. The first vertex 302 is connected to the second vertex 304 by an edge 350 of the graph-structure 300. As it can be seen, the first vertex 302 and the second vertex 304 are two sequential vertices of the graph-structure 300. Hence, the first vertex 302 defines a first target state 320 of the vehicle 220 along the route and the second vertex 304 defines a second target state 340 of the vehicle 220 along the route that is sequential to the first target state 320. The edge 350 is representative of a transition between the first target state 320 of the vehicle 220 and the second target state 340 of the vehicle 220.

Figure 4:
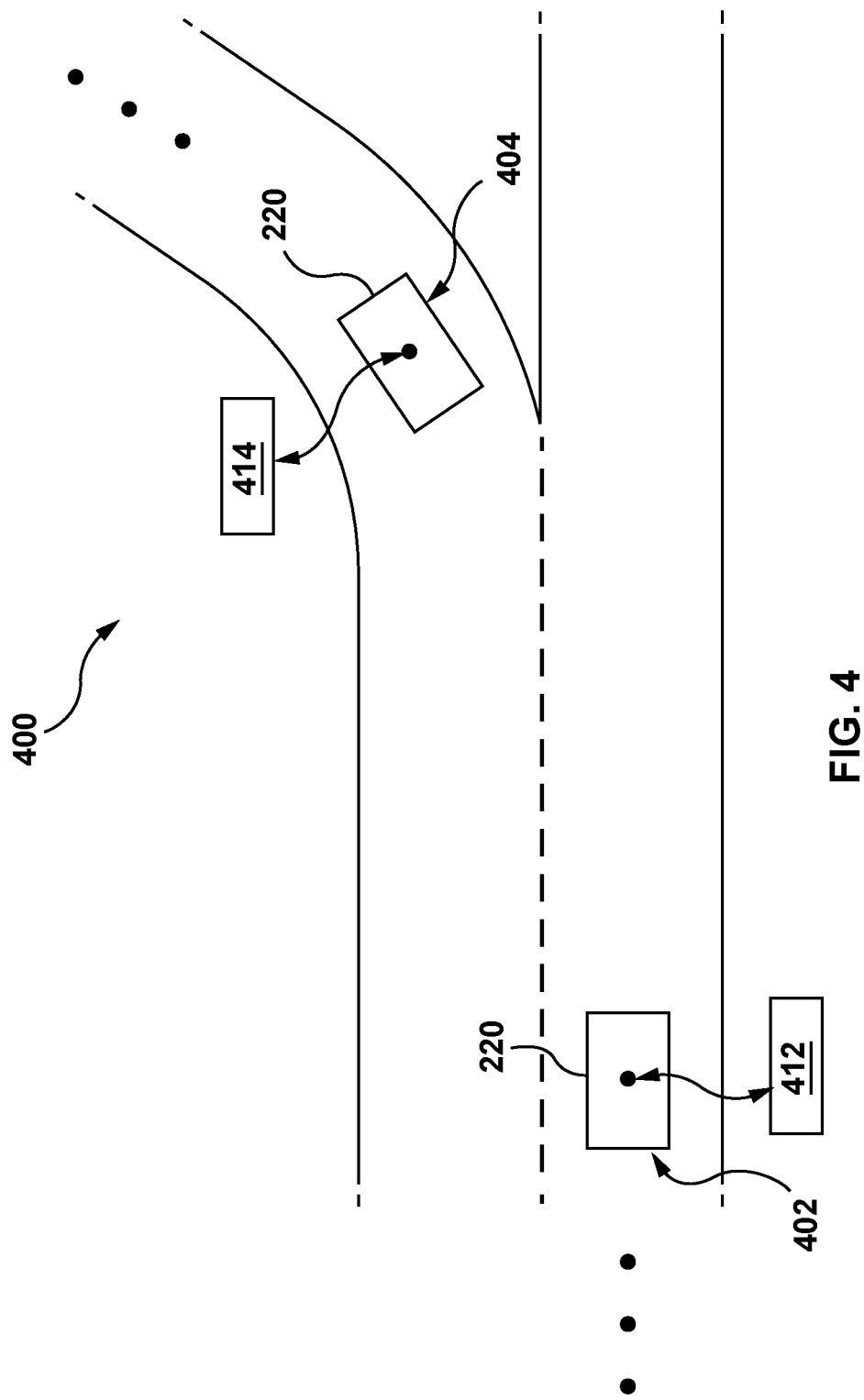
FIG. 4 depicts representations of two sequential target states of a vehicle in the graph-structure of FIG. 3, in accordance with at least some embodiments of the present technology.

With reference to FIG. 4, there is depicted a bird-eye view representation 400 of the vehicle 220 being in two sequential target states along the route. For example, the vehicle 220 being in the first one of the two sequential target states (e.g., the first target state 320) is depicted via representation 402, while the vehicle 220 being in the second one of the two sequential target states (e.g., the second target state 340) is depicted via representation 404.

It is contemplated that a given vertex of the graph-structure 300 may define a respective target state of the vehicle 220 along the route in a form of vehicle state data. This means that the storage 250 storing the graph-structure 300 is configured to store vehicle state data for each vertex of the graph-structure 300, and which vehicle state data represents a respective target state of the vehicle 220 along the route.

The vehicle state data stored for a given vertex of the graph-structure 300 may comprise a plurality of state values. For example, the storage 250 may be configured to store for a respective vertex of the graph structure 300 a respective plurality of state values which comprise at least some of: a position value, a time value, a vehicle orientation value, a steering wheel position value, and the like.

It should be noted that the first one of the two sequential target states 320 of the vehicle 220 (see the representation 402) is represented by a first plurality of state values 412. The first plurality of state values 412 may indicate a position of the vehicle 220 at a first moment in time, a vehicle orientation of the vehicle 220 at the first moment in time, a steering wheel position of the vehicle 220 at the first moment in time, and the like.

Similarly, the second one of the two sequential target states 340 of the vehicle 220 (see the representation 404) is represented by a second plurality of state values 414. The second plurality of state values 414 may indicate a position of the vehicle 220 at a second moment in time (being sequential to the first moment in time), a vehicle orientation of the vehicle 220 at the second moment in time, a steering wheel position of the vehicle 220 at the second moment in time, and the like.

Overall, it can be said that the storage 250 may be configured to store the graph-structure 300 that defines a series of target states of the vehicle 220 along the route, or in other words, the storage 250 may store vehicle state data for the vehicle 220 along the route, and where the state vehicle data for the vehicle 220 is indicative of vehicle positions, vehicle orientations, and vehicle steering wheel positions at different moments in time along the route.

As it will become apparent from the description herein further below, developers of the present technology have devised methods and processors for generating trajectories for the vehicle 220 for, in a sense, "transitioning" from (i) a given target state of the vehicle 220 in the graph-structure 300 to (ii) a sequential target state of the vehicle 220 in the graph-structure 300.

Furthermore, developers of the present technology have devised methods and processors for generating "steering wheel control data" for controlling steering of the vehicle 220 during operation which allows the vehicle 220 to, in a sense, "transition" from (i) the given target state of the vehicle 220 in the graph-structure 300 to (ii) the sequential target state of the vehicle 220 in the graph-structure 300.

Figure 5:
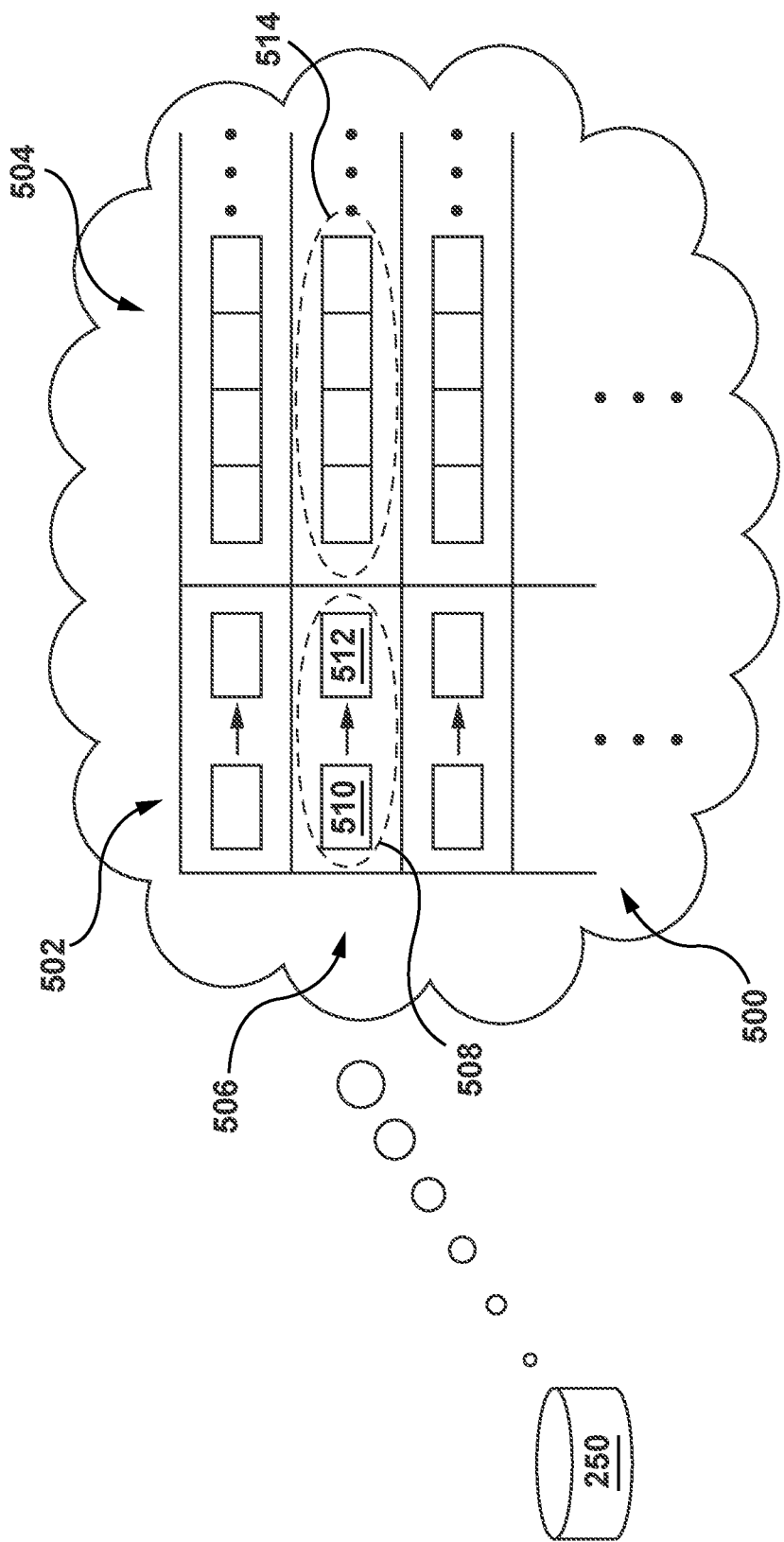
FIG. 5 depicts polynomial-generation data in a form of a table stored within the networked computing environment of FIG. 2, in accordance with at least some embodiments of the present technology.

With reference to FIG. 5, the storage 250 may also be configured to store polynomial-generation data in a form of a table 500. As seen, the table 500 comprises a state-transition column 502 and a polynomial-parameters column 504. For example, a second row 506 of the table 500 includes a respective state-transition pair 508—that is, data indicative of a transition from a first state 510 to a second state 512—and a respective set of parameters 514.

Broadly speaking, the table 500 has been generated and stored in the storage 250 such that the set of parameters 514 may be employed by the processor 110 to generate a given polynomial curve that represents a plurality of steering wheel positions of the vehicle 220 at respective moments in time such that a given vehicle (such as the vehicle 220, for example), when steered in accordance with the plurality of steering wheel positions, may transition from the first state 510 to the second state 512. Therefore, it can be said that the set of parameters 514 may be used to generate, in a sense, a given "steering profile" that represents a plurality of steering wheel positions at different moments in time for allowing a given vehicle to transition from the first state 510 to the second state 512.

It should be noted that the manner in which the processor 110 may be configured to generate/build a given polynomial curve based on a given set of parameters (such as the set of parameters 514) is described in greater detail in an article entitled "Motion Planning for Autonomous Driving with a Conformal Spatiotemporal Lattice", authored by Matthew McNaughton et al., the content of which is incorporated herein in by reference in its entirety.

In one embodiment, a given set of parameters stored in the table 500 may comprise at least four parameters. In an other embodiment, the given set of parameters may comprise at least one parameter indicative of a total amount of steering movement. In yet a further embodiment, the processor 110 may build/generate a given polynomial curve as a polynomial function of a third degree—for example, the processor 110 may use the given set of parameters as input to the polynomial function for generating/building the given polynomial curve.

In some embodiments of the present technology, it is contemplated that the given set of parameters retrieved from the table 500 may be indicative of a plurality of coefficients that are to be used by the processor 110 as input into the polynomial function for generating/building the given polynomic curve.

It should be noted that the polynomial-generation data in the table 500 may be determined in a variety of ways. In one example, the polynomial-generation data of the table 500 may be generated via a human driver operating a given vehicle.

To better illustrate this, let it be assumed that a given vehicle (potentially the vehicle 220) operated by the human driver is associated with an electronic device (potentially implemented similarly to the electronic device 210). When the human driver operates the given vehicle, it can be said that the given vehicle is driven along a human-desired trajectory. This human-desired trajectory is created by the human driver controlling inter alia the steering wheel of the given vehicle. As the human driver operates the given vehicle, the given electronic device may be configured to capture operation data about the given vehicle. For example, the given electronic device may be configured to gather, for different moments in time during operation of the given vehicle, a plurality of values/parameters representative of, for example: positions of the given vehicle, orientations of the given vehicle, steering wheel positions of the given vehicle, and so forth. This operation data represents information about operation of the given vehicle when the given vehicle is driven along the human-desired trajectory.

The polynomial-generation data of the table 500 may be generated based on this operation data gathered by the given electronic device. For example, based on the operation data gathered by the electronic device, the processor 110 may be configured to (i) determine a number of sequential state pairs of the given vehicle during operation thereof by the human driver, and (ii) for each one of the sequential state pairs, determine a respective steering profile representing a plurality of steering wheel positions of the given vehicle, which the human driver selected via her or his control of the steering wheel, that allowed the given vehicle to transition from a first state in the given state pair to a second state in the given state pair.

In this case, the respective steering profile for the given state pair represents different steering wheel positions that have been selected by the human driver for transitioning from the first state in the given pair to the second state in the given pair in accordance with a human-desired trajectory. As a result, information indicative of this respective steering profile may be stored in a form of a set of parameters for a polynomial function that, when inputted with the set of parameters, would generate a polynomial curve corresponding to the respective steering profile. This set of parameters for the respective steering profile may be stored in the table 500 in association with data indicative of the state pair including the first state and the second state.

Overall, in some embodiments, it can be said that the polynomial-generation data of the table 500 may be generated by (i) gathering operation data about the given vehicle driven in accordance with the human-desired trajectory, (ii) determining different state pairs of the given vehicle during its operation in accordance with the human-desired trajectory, and (iii) determining respective sets of parameters for different state pairs that are indicative of respective steering profiles that allowed the given vehicle to transition between the respective state pairs in accordance with the human-desired trajectory.

In at least some embodiments of the present technology, the storage 250 may be configured to store data representative of a Machine Learning Algorithm (MLA) that the processor 110 is configured to execute.

Generally speaking, MLAs can learn from data. Also, MLAs can make predictions on data. The MLAs are usually used to first build a model based on training inputs of data in order to then make data-driven predictions or decisions expressed as outputs, rather than following static computer-readable instructions. The MLAs are commonly used as estimation models, ranking models, classification models and the like.

It should be understood that different types of the MLAs having different structures or topologies may be used for various tasks.

One particular type of MLAs includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers and in data estimation, data processing, including filtering, clustering, vector embedding and the like.

In at least one embodiment of the present technology, the MLA may be implemented as a Recurrent Neural Network (RNN). Broadly speaking, RNNs is a class of NNs where connections between nodes form a directed graph along a temporal sequence. This allows a given RNN to, in a sense, "learn" and "exhibit" temporal dynamic behaviour. To that end, internal states (memory) of a given RNN can be used to process sequences of inputs. As it will become apparent from the description herein further below, developers of the present technology have realized that this usage of internal states of RNNs for processing sequences of inputs may be beneficial for making predictions, not only based on a current input, but also on at least one previous input.

To summarize, the implementation of a given MLA by the processor 110 can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase. It is contemplated that, in some embodiments of the present technology, the MLA executable by the processor 110 may be one or more suitable supervised, semi-supervised and unsupervised MLAs.

Processor

As previously alluded to, the processor 110 may be configured to determine data for controlling steering of the vehicle 220. How the processor 110 may be configured to determine this data for controlling steering of the vehicle 220 will now be described.

Let it be assumed that, as mentioned above, the processor 110 generated the graph-structure 300 and, hence, the series of target states of the vehicle 220 are generated for the given route. However, in addition to this series of target states, the processor 110 may require additional data for controlling steering of the vehicle 220 so that the vehicle 220 is able to transition from one target state in the series, to a second target state in the series, in turn to a third target state in the series, and so forth. Put another way, it is contemplated that the processor 110 may be configured to determine, for a given pair of sequential target states in the graph-structure 300 such as the pair including the first target state 320 and the second target state 340, how the steering of the vehicle 220 should be controlled in order to arrive from the first target state 320 to the second target state 340.

How the processor 110 is configured to determine a given target steering profile representing a plurality of target steering positions at different moment in time for allowing the vehicle 220 to transition from (i) the first target state 320 (see the representation 402 in FIG. 4) to (ii) the second target state 340 (see the representation 404 in FIG. 4) will now be described in greater details. However, it should be noted that the processor 110 may be configured to determine such a target steering profile for any pair of two sequential target states in the graph-structure 300 similarly to how the processor 110 is configured to determine the given target steering profile for the pair of sequential target states including (i) the first target state 320 (see the representation 402 in FIG. 4) to (ii) the second target state 340 (see the representation 404 in FIG. 4).

In some embodiments of the present technology, it is contemplated that the processor 110 may be configured to perform a search operation in the table 500 depicted in FIG. 5 in order to identify a given set of parameters that is associated with a given state pair that is a most similar state pair amongst all state pairs in the table 500 to the pair including the first target state 320 and the second target state 340. For example, the search operation may be triggered in response to acquiring the vehicle state data associated with the first target state 320 and the second target state 340.

As mentioned above, the first target state 320 is associated with the first plurality of state values 412 (vehicle state data) while the second target state 340 is associated with the second plurality of state values 414 (vehicle state data). As such, the processor 110 may perform the search in the table 500 by using the first plurality of state values 412 (being vehicle state data for the first target state 320) and the second plurality of state values 414 (being vehicle state data for the second target state 340).

How the search operation is performed by the processor 110 is not particularly limiting and can be implemented in any suitable manner for a given application. Nevertheless, once the search operation is performed, the processor 110 may be configured to acquire a given set of parameters associated with a given state pair that is a most similar state pair amongst all state pairs in the table 500 to the pair including the first target state 320 and the second target state 340.

Figure 6:
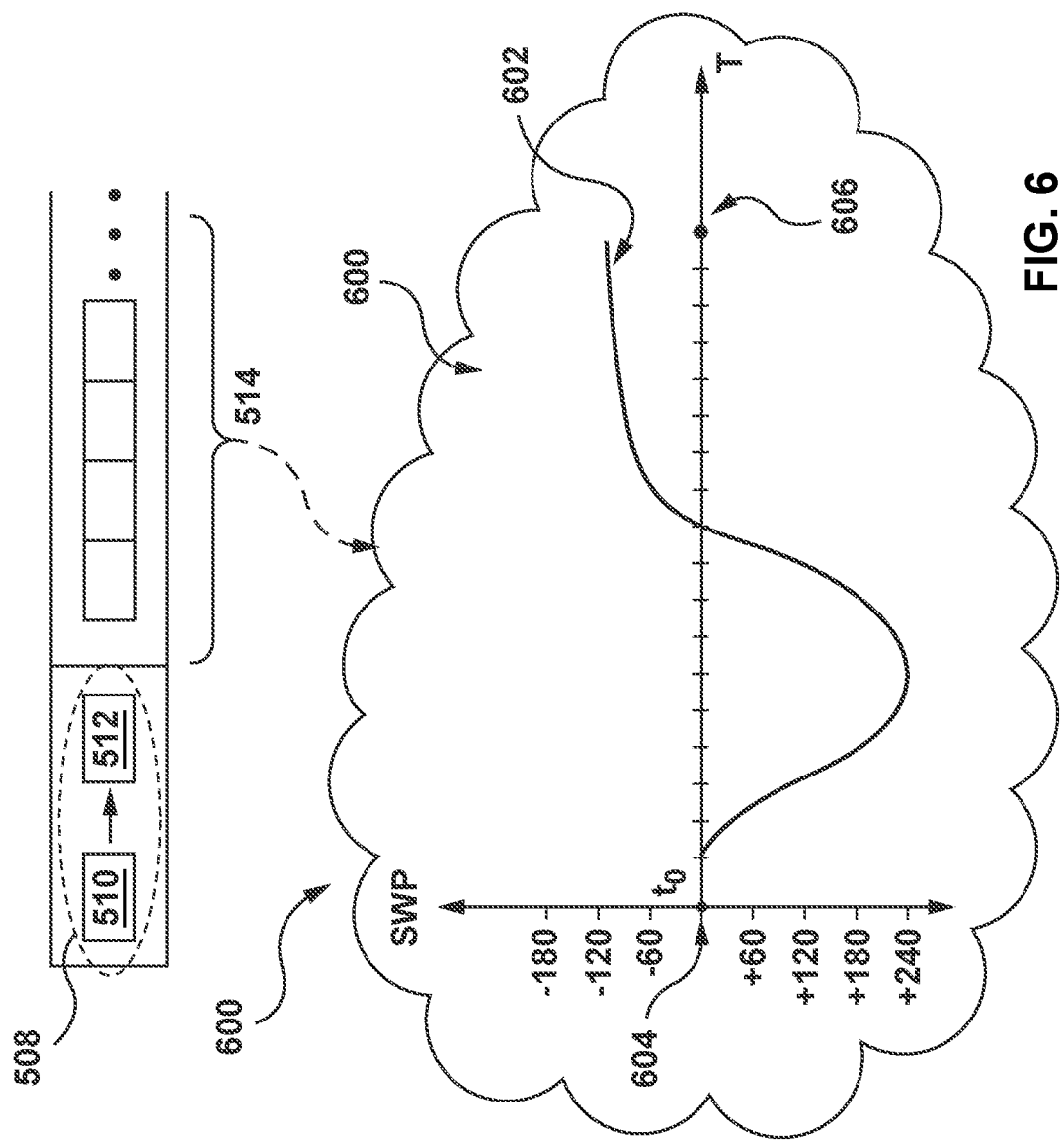
FIG. 6 depicts a graphical representation of a polynomial curve generated by a processor of the computer system of FIG. 1, in accordance with at least some embodiments of the present technology.

To better illustrate this, let it be assumed that the given state pair that is a most similar state pair amongst all state pairs in the table 500 to the pair including the first target state 320 and the second target state 340 is the state pair 508 illustrated in FIGS. 5 and 6. It can be said that, in this example, a transition between the first target state 320 and the second target state 340 is most similar to a transition between the first state 510 and the second state 512 than to any other transition amongst respective state pairs of the table 500.

Once the state pair 508 is identified as the most similar state pair amongst all state pairs in the table 500 to the pair including the first target state 320 and the second target state 340, the processor 110 may be configured to acquire the respective associated set of parameters 514.

Once the set of parameters 514 is acquired, the processor 110 may be configured to generate/build, based on the set of parameters 514, a polynomial curve 602 illustrated via a graphical representation 600 in FIG. 6. As seen, the graphical representation 600 includes two axes, namely a time axis identified as "T" axis, and a steering wheel position axis identified as "SWP" axis.

It should be noted that since the state pair 508 is the most similar state pair in the table 500 to the pair including the first target state 320 and the second target state 340, the polynomial curve 602 built based on the set of parameters 514 may be used as a best approximation of the polynomial curve to be used for transitioning from the first target state 320 to the second target state 340.

It should be noted that the steering wheel positions are identified in accordance with their angular position relative to a neural steering wheel position of the steering wheel. For example, a given steering wheel position of −60 corresponds to a given steering wheel position where the steering wheel is rotated 60 degrees counter-clockwise from the neutral steering wheel position. In the same example, a given steering wheel position of +60 corresponds to a given steering wheel position where the steering wheel is rotated 60 degrees clockwise from the neutral steering wheel position.

It should be noted that the polynomial curve 602 represents a candidate steering profile for the vehicle 220 for transitioning from the first target state 320 to the second target state 340. Indeed, this candidate steering profile represents a plurality of candidate steering wheel positions for the vehicle 220 at different moments in time between (i) the moment in time associated with the first target state 320, and (ii) the moment in time associated with the second target state 340.

For example, the polynomial curve 602 begins at a starting moment in time 604 which corresponds to the moment in time associated with the first target state 320. Then, the polynomial curve 602 provides indications of candidate steering wheel positions at different moments in time after the starting moment in time 604 and until an ending moment in time 606 that corresponds to the moment in time associated with the second target state 340.

It should be noted that developers of the present technology have realized that, in some situations, a given candidate steering profile (given polynomial curve generated based on a given set of parameters) may include at least some candidate steering wheel positions that are not physically possible or otherwise too dangerous to be used, in at least some circumstances, during operation of the vehicle 220. Put another way, the developers of the present technology have realized that the vehicle 220 may be associated with a pre-determined range of steering wheel positions that are either physically possible or otherwise safe to be used during operation of the vehicle 220 in a given situation.

In some embodiments of the present technology, it is contemplated that the pre-determined range of steering wheel positions may be indicative of a maximum amplitude of steering that the vehicle 220 is physically configured to perform or otherwise able to safely perform in a given situation. Just as an example, the pre-determined range of steering wheel positions may be [−900, +900]. In another example, the pre-determined range of steering wheel positions may be [−180, +180].

It is contemplated that in some embodiments of the present technology, a given range of steering wheel positions may be pre-determined for a respective speed at which the vehicle 220 is currently travelling. For example, if the vehicle 220 is travelling at a relatively low speed (e.g., speed during parking manoeuvres), the pre-determined range may be [−900, +900]. In another example, if the vehicle 220 is travelling at a relatively high speed (e.g., speed on a road and/or highway), the pre-determine range may be [−180, +180]. In some embodiments, the pre-determined ranges for respective speeds of the vehicle 220 may be pre-computed and stored in the storage 250 for future use.

In the context of the present description, steering wheel positions inside this pre-determined range may be referred to as "allowed steering wheel positions" while steering wheel positions outside this pre-determined range may be referred to as "non-allowed steering wheel positions".

In some embodiments of the present technology, it is contemplated that the processor 110 may be configured to perform a trajectory simulation operation based on the polynomial curve 602. In other words, the processor 110 may be configured to use the polynomial curve 602 for simulating (e.g., generating) a candidate trajectory of the vehicle 220 as if the vehicle 220 is steered in accordance with the plurality of candidate steering wheel positions of the candidate steering profile represented by the polynomial curve 602.

The purpose of the processor 110 simulating the candidate trajectory is to determine (i) whether or not the vehicle 220 will indeed transition to the second target state 340 from the first target state 320 if the vehicle 220 is steered in accordance with the plurality of candidate steering wheel positions of the polynomial curve 602, and (ii) which trajectory will the vehicle 220 undertake for transitioning to the second target state 340 from the first target 320 if the vehicle 220 is steered in accordance with the plurality of candidate steering wheel positions of the polynomial curve 602.

How the processor 110 is configured to simulate the candidate trajectory based on the polynomial curve 602 will now be described in greater details with reference to FIGS. 7 and 8.

Figure 7:
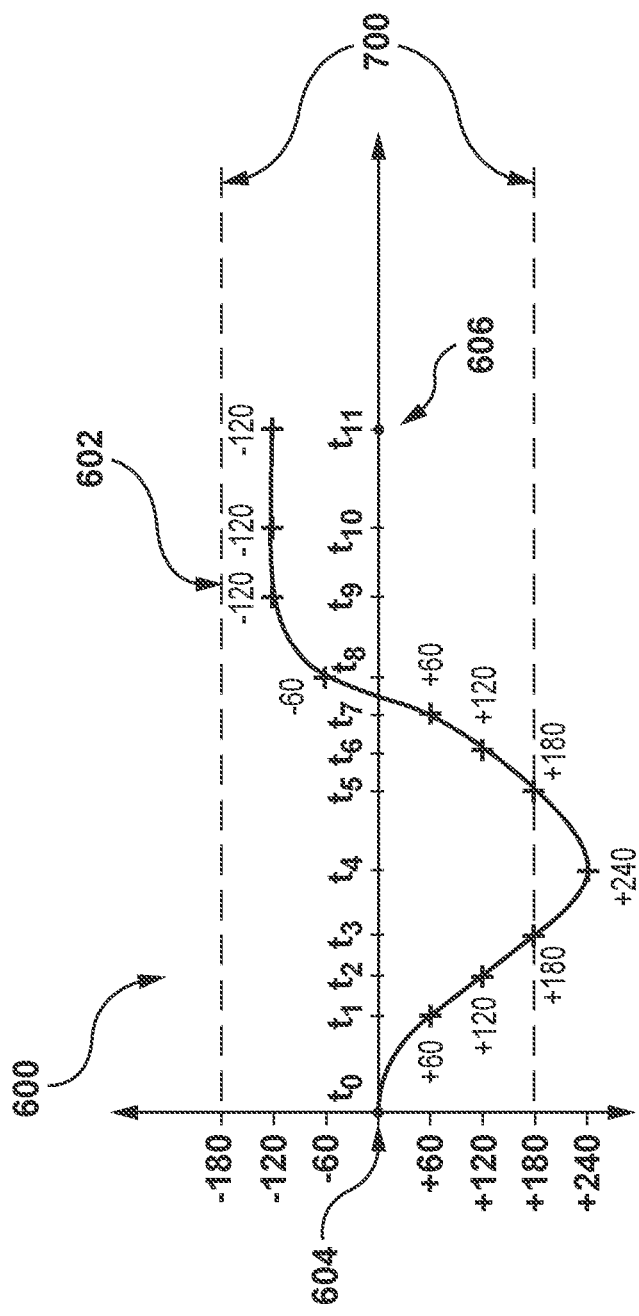
FIG. 7 depicts a pre-determined range of steering wheel positions and the a graphical representation of a polynomial curve of FIG. 6.

In FIG. 7, the graphical representation 600 is illustrated in greater detail with a pre-determined range of steering wheel positions 700. As mentioned above, the polynomial curve 602 begins at the starting moment in time 604 which corresponds to the moment in time associated with the first target state 320. In FIG. 7, the starting moment in time corresponds to a moment t0. In addition to the moment t0, a plurality of moments is also depicted, namely: moments t2, t3, t4, t5, t6, t7, t8, t9, t10, and t11. As mentioned above, the polynomial curve 602 ends at the ending moment in time 606 that corresponds to the moment in time associated with the second target state 340. In FIG. 7, the ending moment in time corresponds to the moment t11.

Therefore, it can be said, that the moments t1, t2, t3, t4, t5, t6, t7, t8, t9, and t10 are different moments in time between the starting moment in time 604 and the ending moment in time 606 and for which the polynomial curve 602 provides indications of candidate steering wheel positions. As illustrated, the polynomial curve 602 provides indications of:

a candidate steering wheel position of 0 for the moment t0;
a candidate steering wheel position of +60 for the moment t1;
a candidate steering wheel position of −120 for the moment t2;
a candidate steering wheel position of +180 for the moment t3;
a candidate steering wheel position of +240 for the moment t4;
a candidate steering wheel position of +180 for the moment t5;
a candidate steering wheel position of +120 for the moment t6;
a candidate steering wheel position of +60 for the moment t7;
a candidate steering wheel position of −60 for the moment t8;
a candidate steering wheel position of −120 for the moment t9;
a candidate steering wheel position of −120 for the moment t10; and
a candidate steering wheel position of −120 for the moment t11.

It goes without saying that the polynomial curve 602 may also provide indications of steering wheel positions for moments in time that are in between the moments t0, t1, t2, t3, t4, t5, t6, t7, t8, t9, and t10, without departing from the scope of the present technology.

As mentioned above, also illustrated in FIG. 7, is the pre-determined range 700 of steering wheel positions. As seen, the pre-determined range 700 is [−180, +180] which means that, in this example, the allowed steering wheel positions are steering wheel positions that fall inside the [−180, +180] range.

As mentioned above, the processer 110 may be configured to generate a given candidate trajectory for the vehicle 220 based on a given candidate steering profile (e.g., a given polynomial curve). As illustrated in FIG. 8, the processor 110 may be configured to generate a candidate trajectory 800 for the vehicle 220 as if the vehicle 220 is steered in accordance with the plurality of candidate steering wheel positions of the candidate steering profile represented by the polynomial curve 602.

As it can be seen, the candidate trajectory 800 begins at the first target state 320. During generation of the candidate trajectory 800, the processor 110 may be configured to generate a set of intermediary simulated states 830 based on the plurality of candidate steering wheel positions of the candidate steering profile represented by the polynomial curve 602.

For example, based on the candidate steering wheel position of 0 for the moment t0, the processor 110 may be configured to generate a first intermediary simulated state 810 which is indicative of a state of the vehicle 220 at the moment t1 as if the vehicle 220 is steered in accordance with the candidate steering wheel position of 0 and gradually changing to the candidate steering wheel position of +60 between the moment t0 and the moment in time t1.

In the same example, based on the candidate steering wheel position of +60 for the moment t1, the processor 110 may be configured to generate a second intermediary simulated state 811 which is indicative of a state of the vehicle 220 at the moment t2 as if the vehicle 220 is steered in accordance with the candidate steering wheel position of +60 and gradually changing to the candidate steering wheel position of +120 between the moment t1 and the moment in time t2.

Nevertheless, it should be noted that the second intermediary simulated state 811 is not generated solely based on the candidate steering wheel position of +60 for the moment t1, but also based on the first intermediary simulated state 810 of the vehicle 220 at the moment t1. It should be noted that this may be true for each intermediary simulated state in the plurality of intermediary simulated states 830—that is, a given intermediary simulated state may depend on the candidate steering wheel position for a previous target state and on the previous target state itself.

In the same example, based on the candidate steering wheel position of +120 for the moment t2, the processor 110 may be configured to generate a third intermediary simulated state 813 which is indicative of a state of the vehicle 220 at the moment t3 as if the vehicle 220 is steered in accordance with the candidate steering wheel position of +120 and gradually changing to the candidate steering wheel position of +180 between the moment t2 and the moment in time t3.

It should be noted that the candidate steering wheel position of +180 for the moment t3 is still inside the pre-determined range 700, and therefore, is an allowed steering wheel position in this example. However, as it will now be described, once a given candidate steering wheel position for a given moment in time is outside the pre-determined range 700, and therefore, is a non-allowed steering wheel position, the simulation process or generation of a next intermediate target state may be performed by the processor 110 in a different manner than for moments in time associated with candidate steering wheel positions that are inside the pre-determined range 700.

In the same example, based on the candidate steering wheel position of +180 for the moment t3, the processor 110 may be configured to generate a fourth intermediary simulated state 814 which is indicative of a state of the vehicle 220 at the moment t4 as if the vehicle 220 is steered in accordance with the candidate steering wheel position of +180 between the moment t3 and the moment in time t4, instead of generating the fourth intermediary simulated state 814 as if the vehicle 220 is steered in accordance with the candidate steering wheel position of +180 and gradually changing to the candidate steering wheel position of +240 between the moment t3 and the moment in time t4.

Therefore, in some embodiments of the present technology, it is contemplated that when the candidate steering profile represents at least one candidate steering wheel position that is a non-allowed steering wheel position (e.g., outside the pre-determined range 700), the processor 110 may be configured to generate intermediary simulated states as if the vehicle 220 is steered in accordance with the plurality of candidate steering wheel positions at the respective moments in time, and such that a closest allowed steering wheel position to the non-allowed steering wheel position in the pre-determined range 700 of steering wheel positions is used instead of the non-allowed steering wheel position.

Put another way, this means that the processor 110 may be configured to use a steering wheel position of +180 for generation of any intermediary simulated state between the moment t3 and the moment t5.

Continuing with the same example, the processor 110 may be configured to generate a fifth intermediary simulated state 815, which is indicative of a state of the vehicle 220 at the moment t5 as if the vehicle 220 is steered in accordance with the candidate steering wheel position of +180 between the moment t4 and the moment in time t5, instead of generating the fourth intermediary simulated state 815 as if the vehicle 220 is steered in accordance with the candidate steering wheel position of +240 and gradually changing to the candidate steering wheel position of +180 between the moment t4 and the moment in time t5.

As for the rest of the plurality of intermediary simulated states 830, namely intermediary simulated states 816, 817, 818, 819, 820, and a final simulated state 821, they may be generated by the processor 110 similarly to how the processor 110 is configured to generate any one of the first, second and third intermediary simulated states.

Figure 8:
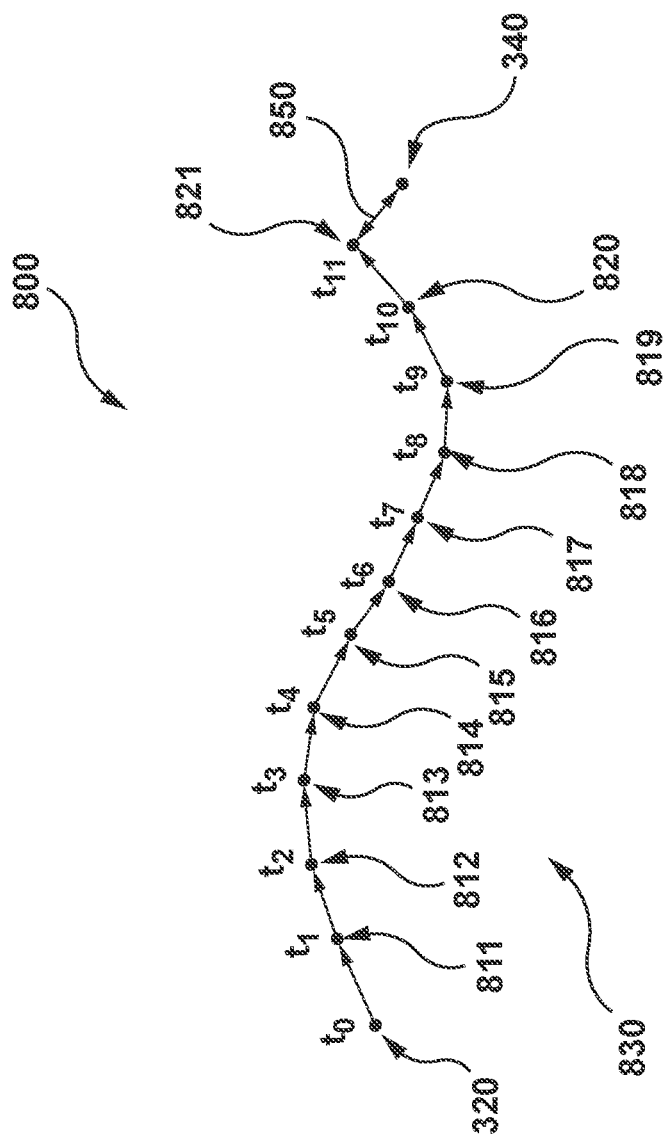
FIG. 8 depicts a candidate trajectory generated by the processor of FIG. 1 based on the polynomial curve of FIG. 6.

Also illustrated in FIG. 8, is the second target state 340. However, it should be noted that the candidate trajectory 800 ends at the moment t11 at a final simulated state 821. Therefore, it can be said that there is an offset 850 between the second target state 340 and the final simulated state 821 at which the candidate trajectory 800 ends.

The offset 850 between the final simulated state 821 and the second target state 340 may occur for different reasons. In one example, the offset 850 may occur due to a non-exact match between the two sequential target states and the pair of states 508. In an other example, the offset 850 may occur due to a limitation of the candidate steering wheel positions (e.g., limitation to +180 degrees) between the moment t3 and the moment t5 during the simulation process.

Irrespective of a specific reason for the occurrence of the offset 850, the processor 110 may be configured to employ the offset 850 in order to determine whether the candidate steering profile (e.g., the polynomial curve 602) is to be selected as a target steering profile for controlling the steering of the vehicle 220 between the first target state 320 and the second target state 340.

In at least some embodiments, the processor 110 may be configured to compare the offset 850 against a pre-determined threshold. The pre-determined threshold may be determined in any suitable manner for a given application. In some cases, if the offset 850 between the final simulated state 821 and the second target state 340 is within an acceptable offset margin from the second target state 340, the processor 110 may select the candidate steering profile (e.g., the polynomial curve 602) as the target steering profile for the vehicle 220 and use the target steering profile for controlling steering of the vehicle 220.

It should be noted that if the polynomial curve 602 is selected as the target steering profile for the vehicle 220, the processor 110 may trigger steering control of the vehicle 220 such that the vehicle 220 is steering in accordance with steering wheel positions that are limited to a value of +180 between the moments t3 and t4.

However, in other cases, if the offset 850 between the final simulated state 821 and the second target state 340 may happen to be outside the acceptable offset margin, the processor 110 may be configured to perform an adjustment procedure. During the adjustment procedure, the processor 110 may be configured to use the offset 850 for adjusting the set of parameters 514, which is used to generate the polynomial curve 602, and thereby determine a set of adjusted parameters for building an adjusted polynomial curve.

How the processor 110 is configured to use the offset 850 for adjusting the set of parameters 514 and thereby determine the set of adjusted parameters is described in the article mentioned above and the content of which is incorporated herein by reference in its entirety. Once the set of adjusted parameters are determined, the processor 110 may be configured to build the adjusted polynomial curve based on the set of adjusted parameters, similarly to how the processor 110 is configured to build the polynomial curve 602 based on the set of parameters 514.

Similarly to what has been described above with respect to the polynomial curve 602, the processor 110 may be configured to use the adjusted polynomial curve for simulating a second candidate trajectory for the vehicle 220 as if the vehicle 220 is steered in accordance with an adjusted steering profile represented by the adjusted polynomial curve. Then, similarly to what has been descried above with respect to the candidate trajectory 800, the processor 110 may be configured to determine a second offset between the second target state 340 and a second final simulated state of the second candidate trajectory.

If the second offset is below the pre-determined threshold, the processor 110 may select the adjusted candidate steering profile (e.g., the adjusted polynomial curve) as the target steering profile and use it to control steering of the vehicle 220. If the second offset is above the pre-determined threshold, the processor 110 may be configured to repeat the adjustment procedure for the adjusted set of parameters, similarly to how the processor 110 is configured to perform the adjustment procedure for the set of parameters 514. Hence, it can be said that the processor 110 may be configured to iteratively repeat the adjustment procedure until a given offset is below the pre-determined threshold.

Hence, during in-use, once the target steering profile is selected as described above, the electronic device 210 may be configured to use the target steering profile in order to control operation of the vehicle 220. More specifically, if the electronic device 210 determines that the vehicle 220 is currently in the first target state 320 and the vehicle 220 is to transition to the second target state 340, the electronic device 210 may be configured to use the target steering profile as determined above to control steering of the vehicle 220 when the vehicle 220 is in the first target state 320 and for allowing the vehicle 220 to transition to the second target state 340.

As mentioned above, in at least some embodiments, the processor 110 may be configured to execute the MLA. In some embodiments, the MLA may be trained and used for predicting an in-use steering wheel position for the vehicle 220 for a current in-use state of the vehicle 220 while taking into account that an in-use trajectory of the vehicle 220 is to end at the second one of the two sequential states in the graph-structure 300. How the MLA may be trained and used to perform such a prediction will now be described in turn.

Training and Using the MLA

Figure 9:
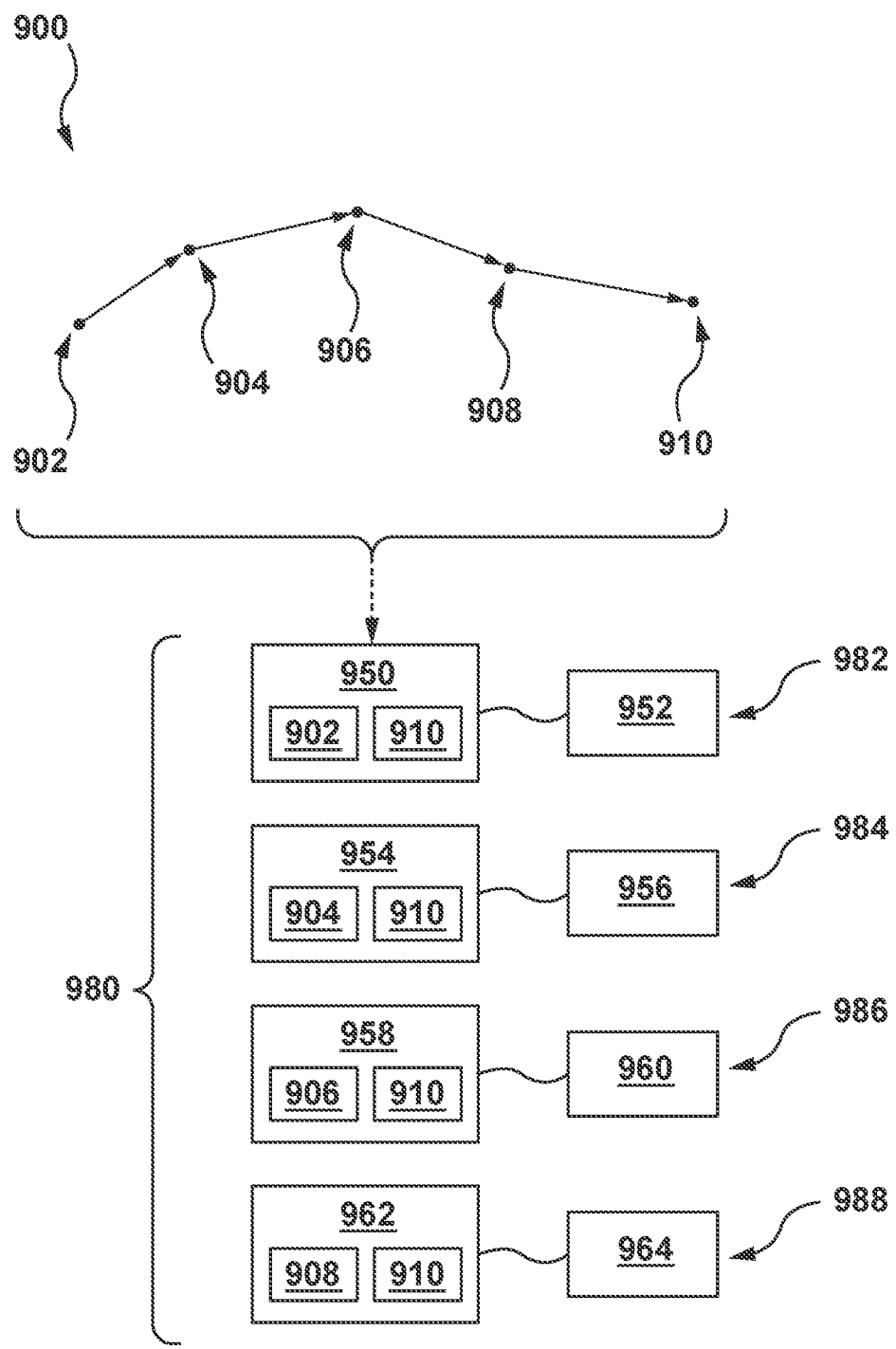
FIG. 9 depicts a training trajectory and a plurality of training data sets for training a Machine Learning Algorithm (MLA) executed within the networked computing environment of FIG. 2, in accordance with at least some embodiments of the present technology.

With reference to FIG. 9, broadly speaking, the processor 110 is configured to train the MLA based on a training trajectory 900. It is contemplated that in at least some embodiments of the present technology, the training trajectory 900 may be generated by the processor 110 (and potentially stored in the storage 250) similarly to how the processor 110 is configured to generate the candidate trajectory 800. In other embodiments, it is contemplated that the training trajectory 900 may be gathered by an electronic device tracking a human-desired trajectory, as explained above.

More specifically, the processor 110 may be configured to generate a plurality of training data sets 980 based on the training trajectory 900 and then train the MLA based on the plurality of training data sets 980. How the processor 110 is configured to generate the plurality of training data sets based on the training trajectory will now be described.

As seen, in this case, the plurality of training data sets 980 for the training trajectory 900 includes four (4) training data sets in total, namely a first training data set 982, a second training data set 984, a third training data set 986, and a fourth training data set 988.

It should be noted that each training data set from the plurality of training data sets 980 includes a respective training input and a respective label. For example, the first training data set 982 includes a first training input 950 and a first label 952. In the same example, the second training data set 984 includes a second training input 954 and a second label 956. In the same example, the third training data set 986 includes a third training input 958 and a third label 960. In the same example, the fourth training data set 988 includes a fourth training input 962 and a fourth label 964.

As seen in FIG. 9, the training trajectory 900 comprises (i) a first target state 902, (ii) a plurality of intermediary target states including intermediary target states 904, 906, and 908, and (iii) the second target state 910. It should be noted that the training trajectory 900 is associated with a plurality of actual steering wheel positions (similarly to how the candidate trajectory 800 is associated with the plurality of candidate steering wheel positions from the polynomial curve 602) at different moments in time, such that at a given actual steering wheel position at a given moment in time allows arriving from a given target state of the training trajectory 900 to a sequential target state in the training trajectory 900.

In some embodiments of the present technology, it is contemplated that a given training data set may be generated by the processor 110 based on (i) target states from the training trajectory 900 and (ii) the plurality of actual steering positions associated with the training trajectory 900.

It should be noted that a given training input from the given training data set includes data indicative of (i) a respective training state and (ii) a second target state 910, and where the respective training state is one of (i) the first target state 902 and (ii) any one of the intermediary target states 904, 906, and 908.

For example, the first training input 950 includes data indicative of (i) the first target state 902 and (ii) the second target state 910. It should be noted that data indicative of a given target state may be in a form of a set of state values as described above. In this example, the second training input 954 includes data indicative of (i) the intermediary target state 904 and (ii) the second target state 910. In this example, the third training input 958 includes data indicative of (i) the intermediary target state 906 and (ii) the second target state 910. In this example, the fourth training input 962 includes data indicative of (i) the intermediary target state 908 and (ii) the second target state 910.

It should be noted that the processor 110 employs information indicative of target states from the training trajectory 900 for generating the training inputs from the plurality of training data sets 980. However, it should also be noted that the processor 110 employs information indicative of the plurality of actual steering wheel positions associated with the training trajectory 900 for generating the respective labels from the plurality of training data sets 980.

For example, the first label 952 is indicative of the actual steering wheel position(s) at respective moment(s) in time for arriving from the first target state to the intermediary target state 904. In the same example, the second label 956 is indicative of the actual steering wheel position(s) at respective moment(s) in time for arriving from the intermediary target state 904 to the intermediary target state 906. In the same example, the third label 960 is indicative of the actual steering wheel position(s) at respective moment(s) in time for arriving from the intermediary target state 906 to the intermediary target state 908. In the same example, the fourth label 960 is indicative of the actual steering wheel position(s) at respective moment(s) in time for arriving from the intermediary target state 908 to the second target state 910.

Overall, a given training data set comprises a given training input and a given label. The given input is indicative of (i) a respective target state (either the first target state 902 or a given intermediary target state) from the training trajectory 900 and the second target state 910 being a last target state of the training trajectory 900 (since the training trajectory 900 ends with the second target state 910). The given label is indicative of the actual steering wheel position(s) at respective moment(s) in time for arriving from the respective target state (either the first target state 902 or a given intermediary target state) to a sequential target states from the training trajectory 900.

How a given training data set is used by the processor 110 to train the MLA will now be described. To better illustrate this, let's take the example of the first training data set 982. The processor 110 is configured to input the first training data set 982 into the MLA. Put another way, the processor 110 may be configured to provide the first training input 950 of the first training data set 982 to the MLA, which is configured to determine a predicted steering wheel position(s) for arriving from the first target state at the respective moment in time to the sequential target state of the training trajectory 900 while taking into account that the training trajectory 900 is to end with the second target state 910. In other words, the MLA may be configured to generate an output indicative of predicted steering wheel position(s) for arriving from the first target state at the respective moment in time to the sequential target state of the training trajectory 900 while taking into account that the training trajectory 900 is to end with the second target state 910. The processor 110 may also be configured to compare this output of the MLA against the first label 982 of the first training data set 982. During the comparison, the processor 110 may be configured to determine a difference between these predicted steering wheel position(s) (outputted by the MLA) for the first target state 902 and the actual steering wheel position(s) for the first target state 902.

Once the processor 110 determines the difference between the predicted steering wheel position(s) for the first target state 902 (output of the MLA) and the actual steering wheel position(s) for the first target state (first label 952), the processor 110 may be configured to train the MLA based on the difference. The processor 110 may so-train the MLA to predict in-use steering wheel position(s) for the vehicle 220 for a current in-use state of the vehicle 220 while taking into account that an in-use trajectory of the vehicle 220 is to end at a second in-use target state.

It should also be noted that in at least some embodiments of the present technology, the processor 110 may be configured to iteratively inputting respective training data sets from the plurality of training data sets 980 into the MLA for determining respective predicted steering wheel position(s) for arriving from the respective training target state to a sequential target state while taking into account that the training trajectory 900 is to end at the second target state 910.

Hence, it is contemplated that in these embodiments, the processor 110 may be configured to train the MLA based on differences between the respective predicted steering wheel positions and respective actual steering wheel positions that are provided to the MLA as the respective labels of the plurality of training data sets 980.

It is contemplated that in these embodiments, the MLA may be a RNN-type MLA having internal memory states.

In at least some embodiments of the present technology, it can be said that the plurality of target states of the training trajectory 900 have been selected for avoiding an obstacle. To better illustrate this, let it be assumed that the training trajectory 900 is a given human-desired trajectory selected by the human operator during operation of a given vehicle. It should be noted that the human operator may have selected the training trajectory 900 for avoiding a given obstacle on the road during operation of the given vehicle. In such cases, information indicative of the position of the obstacle relative to the given vehicle operated by the human operator may have been gathered during operation of the vehicle.

It is therefore contemplated that in cases where the training trajectory has been gathered in association with information indicative of a position of a given obstacle, the position of the given obstacle may also be inputted into the MLA for training purposes. Hence, it can be said that the MLA may, in a sense, "learn" the association between positions of obstacles on the road and in-use steering wheel positions that the MLA is to predict in order to avoid obstacles on the road.

Optionally, in addition to information indicative of a position of a given obstacle, the MLA mays be inputted during the training phase with information indicative a position of a center of a lane on which the training trajectory is present. Hence, it can be said that the MLA may, in a sense, also "learn" the association between the position of centre of the lane and in-use steering wheel positions that the MLA is to predict in order to follow as much as possible the centre of the lane.

Figure 11:
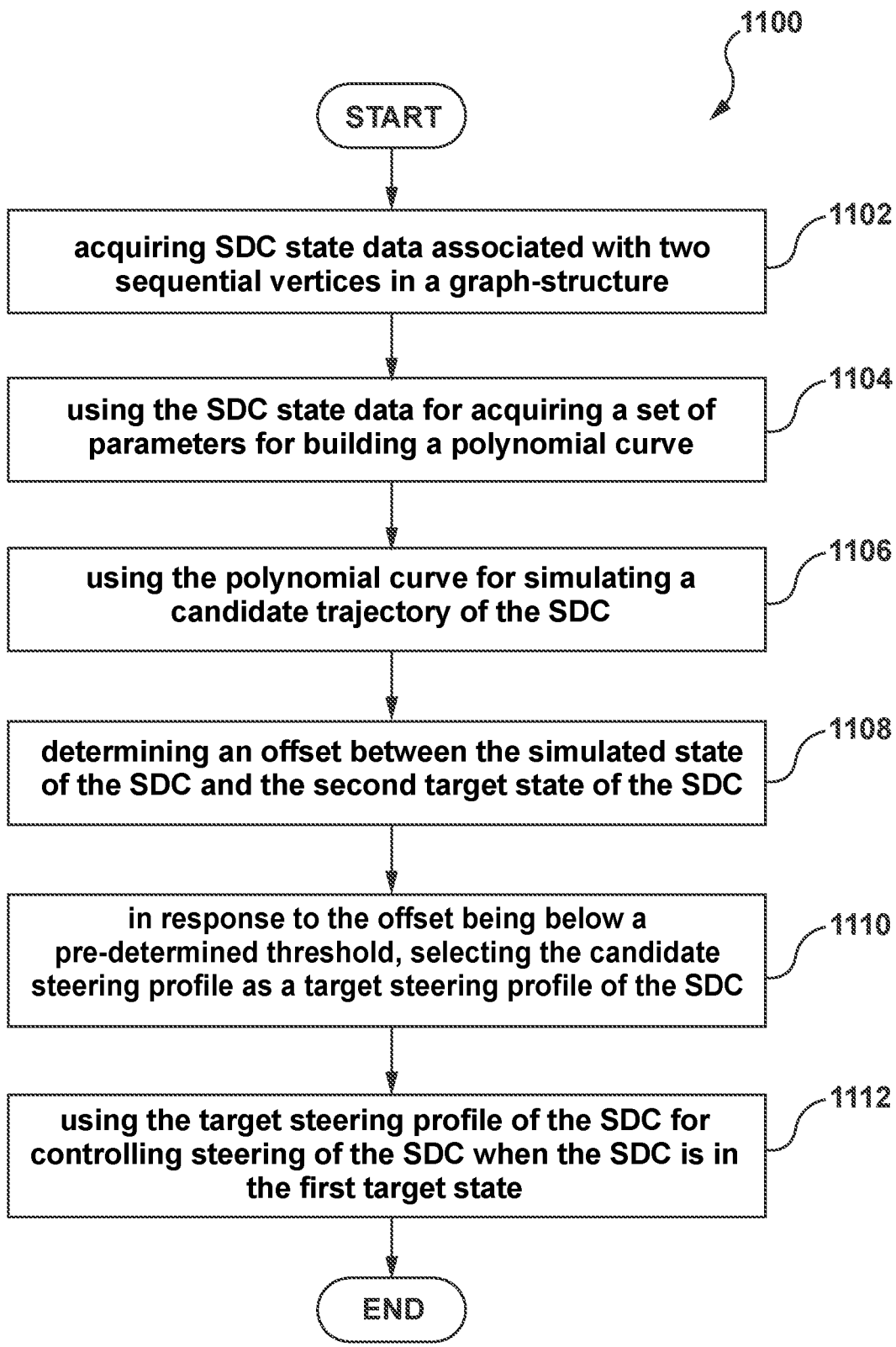
FIG. 11 is scheme-block diagram of a method of controlling steering of the vehicle within the networked environment of FIG. 2, in accordance with at least some embodiments of the present technology.

During in-use, the electronic device 210 may be configured to employ the MLA to determine steering wheel positions for transitioning from the first target state 320 to the second target state 340. With reference to FIG. 11, there is depicted a representation 1000 of the in-use phase of the MLA. As it will become apparent from the description herein further below, during the in-use phase of the MLA, the MLA is employed by the processor 110 in order to incrementally determine steering wheel positions for the vehicle 220 for transitioning between the first target state 320 and the second target state 340.

Figure 10:
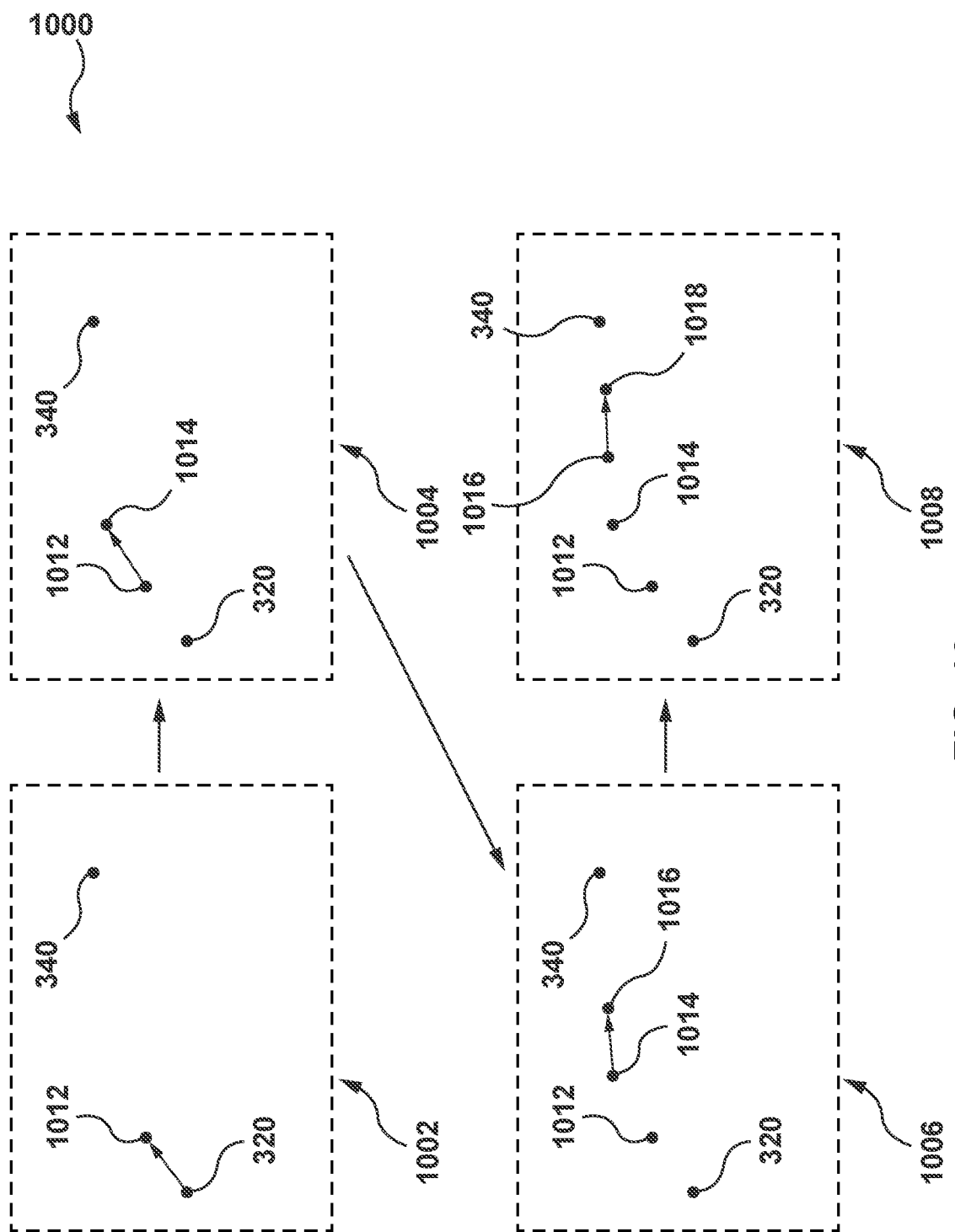
FIG. 10 depicts a representation of an in-use phase of the MLA being executed in a plurality of incremental steps, in accordance with at least some embodiments of the present technology.

For example, as seen in FIG. 10, the representation 1000 of the in-use phase is depicted as including at least four incremental steps, namely: a first incremental step 1002, a second incremental step 1004, a third incremental step 1006 and a fourth incremental step 1008. During a respective incremental step, the processor 110 is configured to input data into the MLA for determining a steering wheel position(s) for the vehicle 220 until a next incremental step of the in-use phase, while taking into account that, at the end of the in-use phase, the vehicle 220 is to transition to the second target state 340.

To better illustrate this, let it be assumed that the processor 110 determines that the vehicle 220 is currently in the first target state 320 and the vehicle 220 is to transition to the second target state 340. In this case, the processor 110 may be configured to use the MLA for determining steering wheel positions for transitioning from the first target state 320 to the second target state 340.

During the first incremental step 1002, the processor 110 may be configured to input (i) vehicle state data associated with the first target state 320 and (ii) the vehicle state data associated with the second target state 340. In such a case, the MLA is configured to output a first steering wheel position(s) for transitioning to a first in-use incremental state 1012 between the first target state 320 and the second target state 340, while taking into account that the vehicle 220 is to transition to the second target state 340 at the end of the in-use phase of the MLA. As such, the first steering wheel position(s) provided by the MLA in response to a first input to the electronic device 210 is for transitioning from the first target state 320 to the second target state 340 via the first in-use intermediary state 1012.

During the second incremental step 1004, the processor 110 may be configured to input into the MLA (i) vehicle state data of the first in-use incremental state 1012 and (ii) the vehicle state data of the second target state 340. In such a case, the MLA is configured to output a second steering wheel position(s) for transitioning to a second in-use incremental state 1014 between the first target state 320 and the second target state 340. As such, recalling that the MLA provided the first steering wheel position(s) during the first incremental step 1002, the MLA is configured to provide during the second incremental step 1004 the second steering wheel position(s) for transitioning from the first target state 320 to the second target state 340 via the first in-use incremental state 1012 and the second in-use incremental state 1014.

During the third incremental step 1006, the processor 110 may be configured to input into the MLA (i) vehicle state data of the second in-use incremental state 1014 and (ii) the vehicle state data of the second target state 340. In such a case, the MLA is configured to output a third steering wheel position(s) for transitioning to a third in-use incremental state 1016 between the first target state 320 and the second target state 340. As such, recalling that the MLA provided the first steering wheel position(s) during the first incremental step 1002 and the second steering wheel position(s) during the second incremental step 1004, the MLA is configured to provide during the third incremental step 1006 the third steering wheel position(s) for transitioning from the first target state 320 to the second target state 340 via the first in-use incremental state 1012, the second in-use incremental state 1014, and the third in-use incremental state 1016.

It should be noted that the fourth incremental step 1008 may be performed in a similar manner for transitioning to a fourth in-use incremental state 1018 to how the first, second and third incremental steps 1002, 1004, and 1006 are performed by the processor 110 employing the MLA. It should be noted that a number of incremental steps of the in-use phase of the MLA may vary based on inter alia a given implementation of the present technology. Nevertheless, it can be said that during the in-use phase of the MLA, the processor 110 may employ the MLA in order to incrementally determine steering wheel positions for the vehicle 220 in order to transition from the first target state 320 to the second target state 340 via one or more in-use incremental states in between the first target state 320 and the second target state 340.

With reference to FIG. 11, there is depicted a scheme-block diagram of a method 1100 of controlling steering of a SDC, such as the vehicle 220, for example. Various steps of the method 1100 will now be described in greater details herein further below.

STEP 1102: Acquiring SDC State Data Associated with Two Sequential Vertices in a Graph-Structure The method 1100 begins at step 1102 with the processor 110 configured to acquire from a memory the SDC state data associated with two sequential vertices in the graph-structure 300. For example, the processor 110 may be configured to acquire the SDC state data associated with the first vertex 302 defining the first target state 320 of the vehicle 220 and with the second vertex 304 defining the second target state 340 of the vehicle 220.

In some embodiments of the present technology, the processor 110 may be configured, prior to performing the step 1102, to generate the graph-structure 300 and for the route the vehicle 220 is to undertake. The processor 110 may also be configured to store it in the storage 250 and/or other memory (prior to performing the step 1102). In some embodiments, the memory may be a memory of a remote server such as the server 235 of FIG. 2 for example.

It is contemplated that the SDC state data associated with a given state of the SDC (and a given vertex of the graph-structure 300) may comprise a plurality of state values. In some embodiments, the plurality of state values for a given vertex of the graph-structure 300 (a given state of the SDC) may comprise at least a position value, a time value, a vehicle orientation value, and a steering wheel position value.

It is contemplated that the storage 350 may be configured to store the plurality of state values in association with a respective state of the SDC and, hence, in association with a respective vertex of the graph-structure 300.

STEP 1104: Using the SDC State Data for Acquiring a Set of Parameters for Building a Polynomial Curve The method 1100 continues to step 1104 with the processor 110 being configured to using the SDC state data acquired during the step 1102 for acquiring a given set of parameters for building a given polynomial curve.

For example, the processor 110 may be configured to use the vehicle state data associated with the first target state 320 and the second target state 340 in order to perform a search operation in the table 500 as explained above.

How the search operation is performed by the processor 110 is not particularly limiting and can be implemented in any suitable manner for a given application. Nevertheless, once the search operation is performed, the processor 110 may be configured to acquire a given set of parameters associated with a given state pair that is a most similar state pair amongst all state pairs in the table 500 to the pair including the first target state 320 and the second target state 340.

As explained above, let it be assumed that the given state pair that is the most similar state pair amongst all state pairs in the table 500 to the pair including the first target state 320 and the second target state 340 is the state pair 508 illustrated in FIGS. 5 and 6. It can be said that, in this example, a transition between the first target state 320 and the second target state 340 is most similar to a transition between the first state 510 and the second state 512 than to any other transition amongst respective state pairs of the table 500.

Once the state pair 508 is identified as the most similar state pair amongst all state pairs in the table 500 to the pair including the first target state 320 and the second target state 340, the processor 110 may be configured to acquire the respectively associated set of parameters 514.

Once the set of parameters 514 is acquired, the processor 110 may be configured to generate/build the polynomial curve 602 based on the set of parameters 514, as explained above.

It should be noted that since the state pair 508 is the most similar state pair in the table 500 to the pair including the first target state 320 and the second target state 340, the polynomial curve 602 built based on the set of parameters 514 may be used as a best approximation of the polynomial curve to be used for transitioning from the first target state 320 to the second target state 340.

It is contemplated that the set of parameters 514 may comprise at least four parameters. Optionally, the set of parameters 514 may comprise at least one parameter being indicative of a total amount of steering movement. Also, it is contemplated that the polynomial curve 602 may be built by the processor 110 as a polynomial function of a third degree.

It should be noted that the polynomial curve 602 is representative of the candidate steering profile of the vehicle 220 for attempting to transition from the first target state 320 to the second target state 340. As explained above, the candidate steering profile represents the plurality of candidate steering wheel positions for the vehicle 220 at respective moments in time between (i) the moment in time associated with the first target state 320 and (ii) the moment in time associated with the second target state 340.

Also, as previously alluded to, at least one candidate steering wheel position from the plurality of candidate steering wheel positions of the polynomial curve 602 may be a non-allowed steering wheel position, where the non-allowed steering wheel position is outside the pre-determined range 700 of steering wheel positions of the vehicle 220.

STEP 1106: Using the Polynomial Curve for Simulating a Candidate Trajectory of the SDC The method 1100 continues to step 1106 with the processor 110 configured to use the polynomial curve 602 for simulating the candidate trajectory 800 (see FIG. 8) of the vehicle 220 as if the vehicle 220 is steered in accordance with the plurality of candidate steering wheel positions of the polynomial curve 602 at the respective moments in time, and such that a closest allowed steering wheel position to the non-allowed steering wheel position (from the polynomial curve 602) in the pre-determined range of steering wheel positions is used instead of the non-allowed steering wheel position.

As mentioned above, once a given candidate steering wheel position for a given moment in time (from the candidate steering profile represented by the polynomial curve 602) is outside the pre-determined range 700, and therefore, is a non-allowed steering wheel position, the simulation process or generation of a next intermediate target state may be performed by the processor 110 in a different manner than for moments in time associated with candidate steering wheel positions that are inside the pre-determined range 700.

With reference to FIGS. 7 and 8, based on the candidate steering wheel position of +180 for the moment t3, the processor 110 may be configured to generate the fourth intermediary simulated state 814 which is indicative of a state of the vehicle 220 at the moment t4 as if the vehicle 220 is steered in accordance with the candidate steering wheel position of +180 between the moment t3 and the moment in time t4, instead of generating the fourth intermediary simulated state 814 as if the vehicle 220 is steered in accordance with the candidate steering wheel position of +180 and gradually changing to the candidate steering wheel position of +240 between the moment t3 and the moment in time t4.

Therefore, in some embodiments of the present technology, it is contemplated that when the candidate steering profile represents at least one candidate steering wheel position that is a non-allowed steering wheel position (e.g., outside the pre-determined range 700), the processor 110 may be configured to generate intermediary simulated states as if the vehicle 220 is steered in accordance with the plurality of candidate steering wheel positions at the respective moments in time, and such that a closest allowed steering wheel position to the non-allowed steering wheel position in the pre-determined range 700 of steering wheel positions is used instead of the non-allowed steering wheel position.

It should be noted that the candidate trajectory 800 that is simulated by the processor 110 based on the polynomial curve 602, begins at the first target state 320 and terminates at the simulated state 821. In some embodiments, it is contemplated that the pre-determined range 700 of steering wheel positions may be indicative of a maximum amplitude of steering that the vehicle 220 is physically configured to perform.

STEP 1108: Determining an Offset Between the Simulated State of the SDC and the Second Target State of the SDC The method 1100 continues to step 1108 with the processor 110 configured to determine the offset 850 between the simulated state 821 and the second target state 340. As mentioned above, the offset 850 between the final simulated state 821 and the second target state 340 may occur for different reasons. In one example, the offset 850 may occur due to a non-exact match between the two sequential target states (the first target state 320 and the second target state 340) and the pair of states 508. In an other example, the offset 850 may occur due to a limitation of the candidate steering wheel positions (e.g., limitation to +180 degrees) between the moment t3 and the moment t5 during the simulation process.

Irrespective of a specific reason for the occurrence of the offset 850, the processor 110 may be configured to employ the offset 850 in order to determine whether the candidate steering profile (e.g., the polynomial curve 602) is to be selected as a target steering profile for controlling the steering of the vehicle 220 between the first target state 320 and the second target state 340.

In at least some embodiments, the processor 110 may be configured to compare the offset 850 against a pre-determined threshold. The pre-determined threshold may be determined in any suitable manner for a given application. In some cases, if the offset 850 between the final simulated state 821 and the second target state 340 is within an acceptable offset margin from the second target state 340, the processor 110 may select the candidate steering profile (e.g., the polynomial curve 602) as the target steering profile for the vehicle 220 and use the target steering profile for controlling steering of the vehicle 220.

STEP 1110: In Response to the Offset being Below a Pre-Determined Threshold, Selecting the Candidate Steering Profile as a Target Steering Profile of the SDC The method 1100 continues to step 1110 with the processor 110 configured to, in response to the offset 850 being below the pre-determined threshold, select the candidate steering profile (represented by the polynomial curve 602) as a given target steering profile of the vehicle 220 for transitioning between the first target state 320 and the second target state 340.

It should be noted that if the polynomial curve 602 is selected as the target steering profile for the vehicle 220, the processor 110 may trigger steering control of the vehicle 220 such that the vehicle 220 is steering in accordance with steering wheel positions that are limited to a value of +180 between the moments t3 and t4.

However, in other cases, if the offset 850 between the final simulated state 821 and the second target state 340 may happen to be outside the acceptable offset margin, the processor 110 may be configured to perform an adjustment procedure. During the adjustment procedure, the processor 110 may be configured to use the offset 850 for adjusting the set of parameters 514, which is used to generate the polynomial curve 602, and thereby determine a set of adjusted parameters for building an adjusted polynomial curve.

How the processor 110 is configured to use the offset 850 for adjusting the set of parameters 514 and thereby determine the set of adjusted parameters is described in the article mentioned above and the content of which is incorporated herein by reference in its entirety. Once the set of adjusted parameters are determined, the processor 110 may be configured to build the adjusted polynomial curve based on the set of adjusted parameters, similarly to how the processor 110 is configured to build the polynomial curve 602 based on the set of parameters 514.

Similarly to what has been described above with respect to the polynomial curve 602, the processor 110 may be configured to use the adjusted polynomial curve for simulating a second candidate trajectory for the vehicle 220 as if the vehicle 220 is steered in accordance with an adjusted steering profile represented by the adjusted polynomial curve. Then, similarly to what has been descried above with respect to the candidate trajectory 800, the processor 110 may be configured to determine a second offset between the second target state 340 and a second final simulated state of the second candidate trajectory.

If the second offset is below the pre-determined threshold, the processor 110 may select the adjusted candidate steering profile (e.g., the adjusted polynomial curve) as the target steering profile and use it to control steering of the vehicle 220. If the second offset is above the pre-determined threshold, the processor 110 may be configured to repeat the adjustment procedure for the adjusted set of parameters, similarly to how the processor 110 is configured to perform the adjustment procedure for the set of parameters 514. Hence, it can be said that the processor 110 may be configured to iteratively repeat the adjustment procedure until a given offset is below the pre-determined threshold.

STEP 1112: Using the Target Steering Profile of the SDC for Controlling Steering of the SDC when the SDC is in the First Target State The method 1100 continues to step 1112 with the processor 110 configured to use the target steering profile of the vehicle 220 for controlling steering of the vehicle 220 when the vehicle 220 is in the first target state 320.

For example, if the candidate steering profile represented by the polynomial curve 602 is selected as the target steering profile, the processor 110 may be configured to use the polynomial curve 602 in order to control steering of the vehicle 220 when the vehicle 220 is in the first target state 320.

In another example, if the adjusted candidate steering profile represented by the adjusted polynomial curve (built as a result of the adjustment procedure mentioned above) is selected as the target steering profile, the processor 110 may be configured to use the adjusted polynomial curve 602 in order to control steering of the vehicle 220 when the vehicle 220 is in the first target state 320.

In some embodiments of the present technology, it is also contemplated that the processor 110 may be configured to use (i) the first target state 320 (for example, vehicle state data associated with the first target state 320), (ii) the second target state (for example, vehicle state data associated with the second target state 340), and (iii) the target steering profile of the vehicle 220 (represented by one of the polynomial curve 602 and any one of a plurality of potential adjusted polynomial curves) to train the MLA, as mentioned above, to predict an in-use steering wheel position for the vehicle 220 for a current in-use state of the vehicle 220 while taking into account that an in-use trajectory of the vehicle 220 is to end at a second in-use target state.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of controlling steering of a Self-Driving Car (SDC), the SDC being communicatively coupled to a processor, the SDC having a pre-determined range of steering wheel positions that are physically possible for the SDC, the method executable by the processor, the method comprising:
　acquiring, by the processor from a memory, SDC state data associated with two sequential vertices in a graph-structure,
　　vertices of the graph-structure defining a series of target states of the SDC on a route,
　　　a first of the two sequential vertices defining a first target state of the SDC along the route, and
　　　a second of the two sequential vertices defining a second target state of the SDC along the route;
　using, by the processor, the SDC state data for acquiring a set of parameters for building a polynomial curve,
　　the polynomial curve being representative of a candidate steering profile of the SDC for attempting to transition from the first target state to the second target state;
　　the candidate steering profile representing a plurality of candidate steering wheel positions for the SDC at respective moments in time between (i) a moment in time associated with the first target state and (ii) a moment in time associated with the second target state,
　　at least one candidate steering wheel position from the plurality of candidate steering wheel positions being a non-allowed steering wheel position,
　　　the non-allowed steering wheel position being outside the pre-determined range of steering wheel positions of the SDC;
　using, by the processor, the polynomial curve for simulating a candidate trajectory of the SDC as if the SDC is steered in accordance with the plurality of candidate steering wheel positions at the respective moments in time, and such that a closest allowed steering wheel position to the non-allowed steering wheel position in the pre-determined range of steering wheel positions is used instead of the non-allowed steering wheel position,
　　the candidate trajectory (i) beginning at the first target state of the SDC and (ii) terminating at a simulated state of the SDC;
　determining, by the processor, an offset between the simulated state of the SDC and the second target state of the SDC;
　in response to the offset being below a pre-determined threshold, selecting, by the processor, the candidate steering profile as a target steering profile of the SDC; and
　using, by the processor, the target steering profile of the SDC for controlling steering of the SDC when the SDC is in the first target state.

2. The method of claim 1, wherein prior to the acquiring the SDC state data, the method further comprises:
　generating, by the processor, the graph-structure for the route that the SDC is to undertake.

3. The method of claim 1, wherein the memory is a memory of a remote server.

4. The method of claim 1, wherein the set of parameters is acquired from the memory.

5. The method of claim 4, wherein the memory is configured to store respective sets of parameters for respective pairs of sequential pre-determined SDC states.

6. The method of claim 1, wherein the SDC state data associated with a given state of the SDC comprises a plurality of state values.

7. The method of claim 6, wherein each of the plurality of state values comprises at least:
　a position value;
　a time value;
　a vehicle orientation value; and
　a steering position value.

8. The method of claim 1, wherein the set of parameters comprises at least four parameters.

9. The method of claim 8, wherein the set of parameters comprises at least one parameter being indicative of a total amount of steering movement.

10. The method of claim 1, wherein the polynomial curve is built as a polynomial function of a third degree.

11. The method of claim 1, wherein the pre-determined range of steering wheel positions is indicative of a maximum amplitude of steering that the SDC is physically configured to perform.

12. The method of claim 1, wherein the method further comprises:
　comparing, by the processor, the offset against the pre-determined threshold.

13. The method of claim 12, wherein the offset is below the pre-determined threshold when the simulated state of the SDC matches the second target state of the SDC.

14. The method of claim 1, wherein in response to the offset being above the pre-determined threshold, the method further comprises performing, by the processor, an adjustment procedure, the adjustment procedure comprising:

using, by the processor, the offset for adjusting the set of parameters, thereby determining a set of adjusted parameters for building an adjusted polynomial curve, the adjusted polynomial curve being representative of an adjusted steering profile for the SDC for attempting to transition from the first target state to the second target state;

using, by the processor, the adjusted polynomial curve for simulating a second candidate trajectory of the SDC as if the SDC is steered in accordance with the adjusted steering profile, the second candidate trajectory (i) beginning at the first target state of the SDC and (ii) terminating at a second simulated state of the SDC;

determining, by the processor, a second offset between the second simulated state of the SDC and the second target state of the SDC; and in response to the second offset being below the pre-determined threshold, selecting, by the processor, the adjusted steering profile as the target steering profile for the SDC.

15. The method of claim 14, wherein the method further comprises:

iteratively repeating, by the processor, the adjustment procedure until a given offset is below the pre-determined threshold.

16. The method of claim 3, wherein the method further comprises:

using, by the remote server, (i) the first target state, (ii) the second target state, and (iii) the target steering profile of the SDC to train a Machine Learning Algorithm (MLA) to predict an in-use steering wheel position for the SDC for a current in-use state of the SDC while taking into account that an in-use trajectory of the SDC is to end at a second in-use target state.

* * * * *